United States Patent
Ahn et al.

(10) Patent No.: US 9,088,992 B2
(45) Date of Patent: Jul. 21, 2015

(54) APPARATUS AND METHOD FOR CONTROLLING IN-DEVICE COEXISTENCE INTERFERENCE IN WIRELESS COMMUNICATION SYSTEM

(71) Applicant: Pantech Co., Ltd., Seoul (KR)

(72) Inventors: Jae Hyun Ahn, Seoul (KR); Myung Cheul Jung, Seoul (KR); Kang Suk Huh, Seoul (KR); Ki Bum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 190 days.

(21) Appl. No.: 13/847,319

(22) Filed: Mar. 19, 2013

(65) Prior Publication Data

US 2013/0242833 A1   Sep. 19, 2013

(30) Foreign Application Priority Data

Mar. 19, 2012   (KR) .................. 10-2012-0027938

(51) Int. Cl.
*H04W 72/08* (2009.01)
*H04W 76/04* (2009.01)
*H04W 36/04* (2009.01)

(52) U.S. Cl.
CPC ............ *H04W 72/082* (2013.01); *H04W 36/04* (2013.01); *H04W 76/048* (2013.01)

(58) Field of Classification Search
None
See application file for complete search history.

(56) References Cited

U.S. PATENT DOCUMENTS

| 2011/0312288 | A1* | 12/2011 | Fu et al. ..................... 455/88 |
| 2012/0082140 | A1* | 4/2012 | Lin et al. .................... 370/336 |
| 2012/0087341 | A1* | 4/2012 | Jang et al. ................... 370/331 |
| 2012/0213162 | A1* | 8/2012 | Koo et al. .................... 370/329 |
| 2013/0208641 | A1* | 8/2013 | Baghel et al. ............... 370/311 |
| 2013/0301468 | A1* | 11/2013 | Lee et al. .................... 370/252 |
| 2013/0301537 | A1* | 11/2013 | Lee et al. .................... 370/328 |
| 2014/0247742 | A1* | 9/2014 | Lee et al. .................... 370/252 |

* cited by examiner

*Primary Examiner* — Kerri Rose
(74) *Attorney, Agent, or Firm* — H.C. Park & Associates, PLC

(57) ABSTRACT

A method and an apparatus for controlling in-device coexistence interference (IDC) in a wireless communication system are provided. The present invention comprises transmitting IDC indication information including an unusable frequency band that is a frequency band in which performing communication is difficult because of IDC interference to a evolved NodeB (eNB), receiving Radio Resource Control (RRC) connection reconfiguration including IDC Discontinous Reception (DRX) configuration reconfiguring DRX relating the unusable frequency band based on the IDC indication information from the eNB and performing autonomously denial of Industrial Scientific Medical (ISM) transmission in the unusable frequency band by reconfiguring DRX based on the IDC DRX configuration.

16 Claims, 27 Drawing Sheets

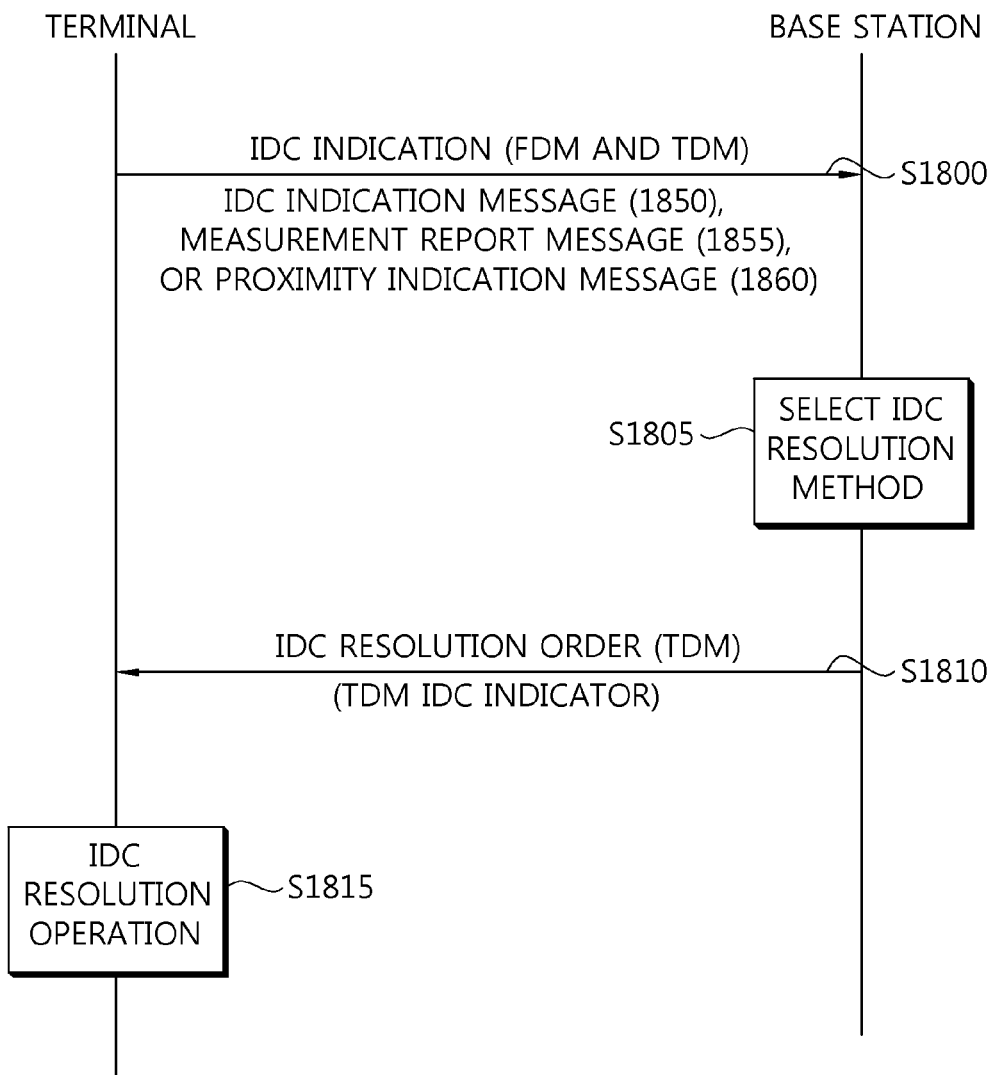

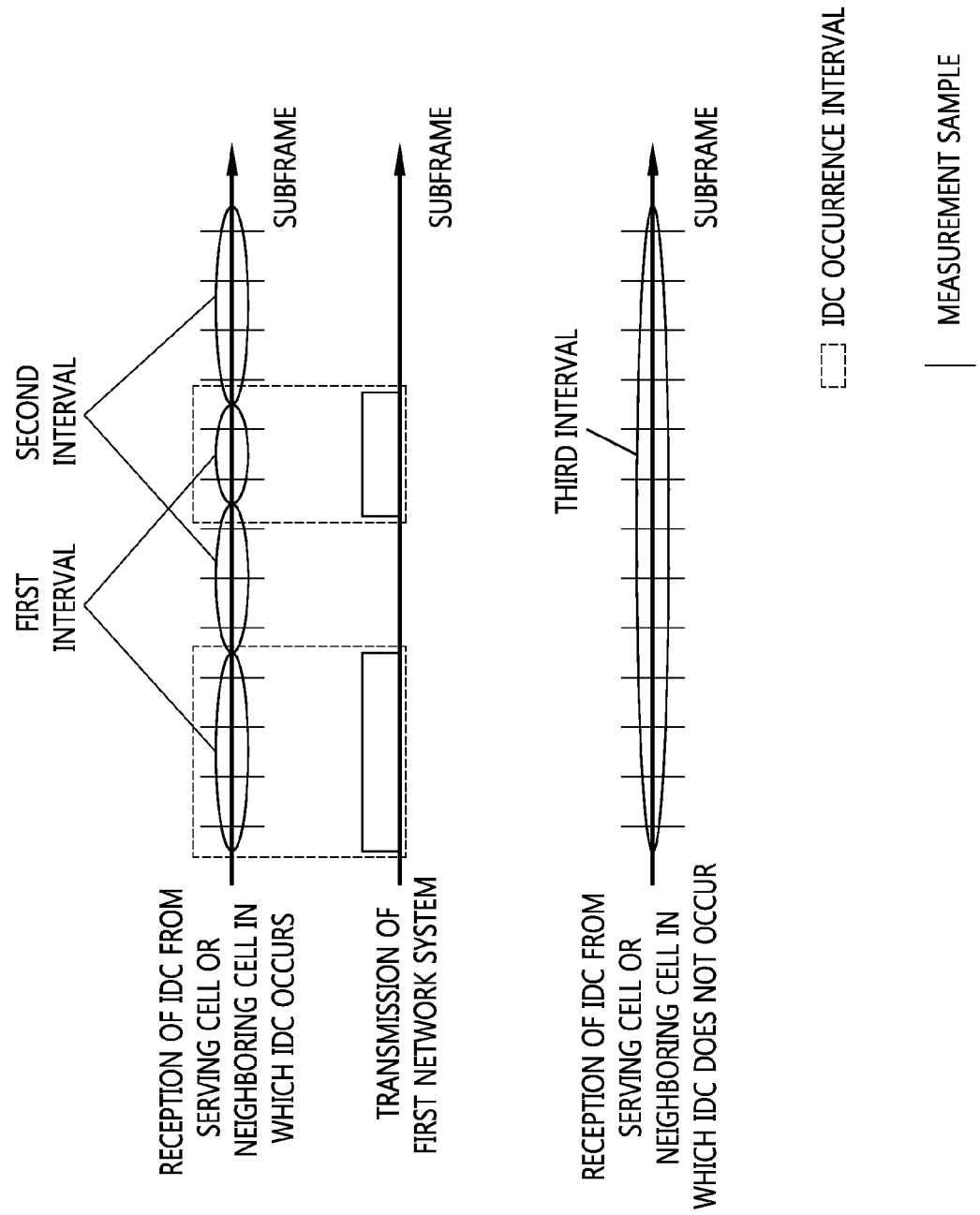

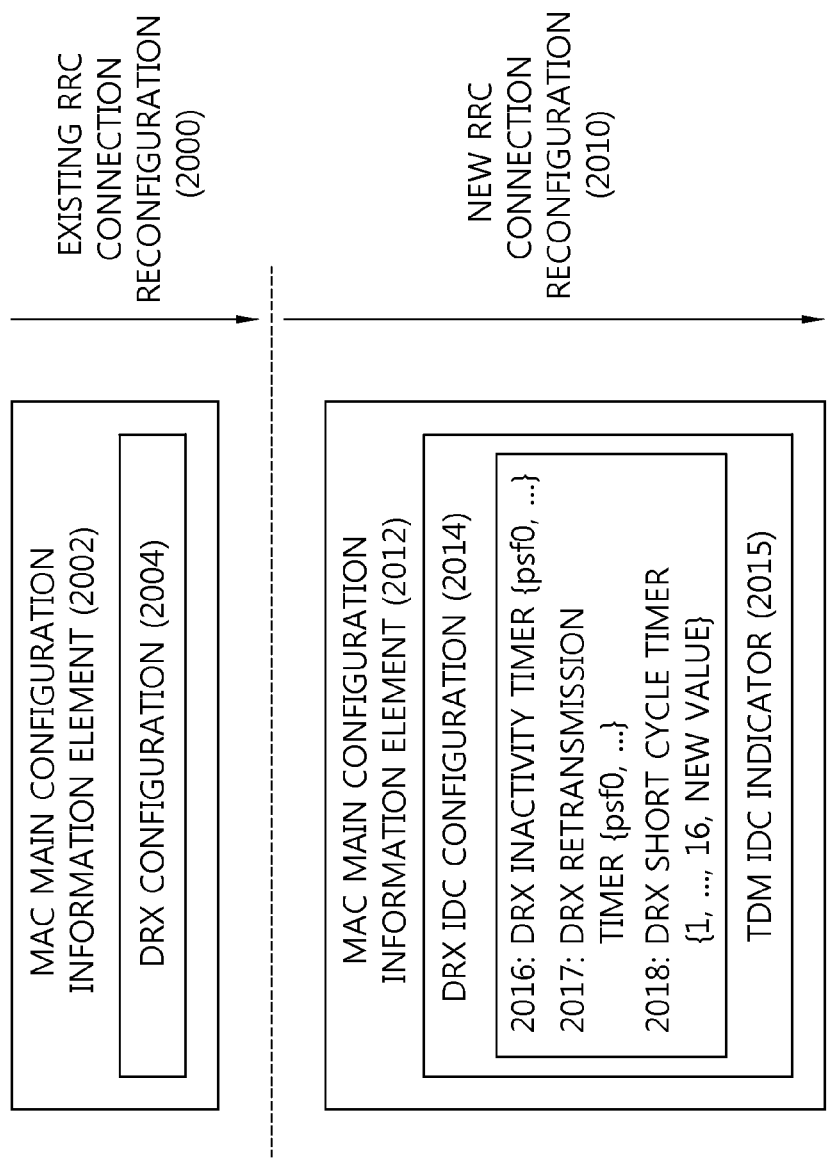

APPARATUS AND METHOD FOR CONTROLLING IN-DEVICE COEXISTENCE INTERFERENCE IN WIRELESS COMMUNICATION SYSTEM

CROSS-REFERENCE TO RELATED APPLICATIONS

This application claims priority from and the benefit of Korean Patent Application No. 10-2012-0027938, filed on Mar. 19, 2012, which is incorporated by reference for all purposes as if fully set forth herein.

BACKGROUND

1. Field

The present invention relates to a wireless communication system and, more particularly, to an apparatus and method for controlling In-Device Coexistence interference in a wireless communication system.

2. Discussion of the Background

In order to support an increased transmission capacity, 3rd generation partnership project (3GPP) long term evolution (LTE) or IEEE 802.16m needs a extended bandwidth thereof up to 20 MHz or more in recent years. The bandwidth may need to increase so as to increase the transmission capacity, but supporting a large bandwidth even when a required service level is low may cause large power consumption. With regard to it, technical trade-off may occur.

Also, in recent years, as functions of a single terminal have been advanced and complicated, the user can communicate with a plurality of network systems simultaneously by using only the single terminal and user convenience has increased. However, when one terminal performs communication on a plurality of network system bands simultaneously, In-Device Coexistence interference (IDC) may occur. The in-device coexistence interference (IDC) means interference when transmission in any one frequency band interferes in reception in another frequency band. For example, the in-device coexistence interference may occur between a Bluetooth system band and a 802.16 system band when one terminal supports both a Bluetooth system and a 802.16 system.

However, in recent wireless network system, coordinating IDC interference have not been determined yet. So, a solution to avoid or control in-device coexistence interference is needed.

SUMMARY

One subject to be solved by the present invention is to provide an apparatus and a method for controlling in-device coexistence interference.

Another subject to be solved by the present invention is to provide a method and an apparatus for providing a TDM (Time Division Multiplexing) operation that controls in-device coexistence interference, either by reconfiguring the pattern of the TDM operation, or by autonomously denying transmission of an ISM band.

Still another subject to be solved by the present invention is to provide an apparatus and a method for detecting the occurrence of in-device coexistence interference with respect to a frequency band that is configured by a network or a frequency band that is not configured by a network.

According to an example of the present invention, a method for controlling in-device coexistence interference through a User Equipment in a wireless communication system comprises transmitting IDC indication information including an unusable frequency band that is a frequency band in which performing communication is difficult because of IDC interference to a evolved NodeB (eNB), receiving Radio Resource Control (RRC) connection reconfiguration including IDC Discontinous Reception (DRX) configuration reconfiguring DRX relating the unusable frequency band based on the IDC indication information from the eNB and performing autonomously denial of Industrial Scientific Medical (ISM) transmission in the unusable frequency band by reconfiguring DRX based on the IDC DRX configuration According to another example of the present invention, a User Equipment (UE) for controlling in-device coexistence interference (IDC) in a wireless communication system comprises a transmission unit transmitting IDC indication information including an unusable frequency band that is a frequency band in which performing communication is difficult because of IDC interference to a evolved NodeB (eNB), a reception unit receiving Radio Resource Control (RRC) connection reconfiguration including IDC Discontinous Reception (DRX) configuration reconfiguring DRX relating the unusable frequency band based on the IDC indication information from the eNB and an IDC resolution unit performing autonomously denial of Industrial Scientific Medical (ISM) transmission in the unusable frequency band by reconfiguring DRX based on the IDC DRX configuration.

According to yet another example of the present invention, a method for controlling in-device coexistence interference (IDC) through a evolved-NodeB (eNB) in a wireless communication system comprises receiving IDC indication information including an unusable frequency band that is a frequency band in which performing communication is difficult because of IDC interference from a User Equipment (UE), determining IDC Discontinous Reception (DRX) configuration reconfiguring DRX relating the unusable frequency band based on the IDC indication information, and selecting IDC resolution operation autonomously denying Industrial Scientific Medical (ISM) transmission in the unusable frequency band and transmitting Radio Resource Control (RRC) connection reconfiguration including the IDC DRX configuration and the IDC resolution operation to the UE.

According to yet another example of the present invention, a evolved-NodeB (eNB) for controlling in-device coexistence interference (IDC) in a wireless communication system comprises a reception unit receiving IDC indication information including an unusable frequency band that is a frequency band in which performing communication is difficult because of IDC interference from a User Equipment (UE), a IDC resolution selection unit determining IDC Discontinous Reception (DRX) configuration reconfiguring DRX relating the unusable frequency band based on the IDC indication information, and selecting IDC resolution operation autonomously denying Industrial Scientific Medical (ISM) transmission in the unusable frequency band and a transmission unit transmitting Radio Resource Control (RRC) connection reconfiguration including the IDC DRX configuration and the IDC resolution operation to the UE.

BRIEF DESCRIPTION OF THE DRAWINGS

FIG. 18 is a flowchart illustrating an example of the operation of a terminal and a base station performing in-device coexistence interference (hereinafter referred to as "IDC") control according to the present invention.

FIG. 19 is a diagram explaining an example in which the terminal performs measurement considering IDC or measurement excluding IDC according to the present invention.

FIGS. 20A to 20C are diagrams illustrating an example of an IDC resolution order indicating that the TDM operation is caused by IDC according to the present invention.

DETAILED DESCRIPTION OF THE ILLUSTRATED EMBODIMENTS

Figure 1:
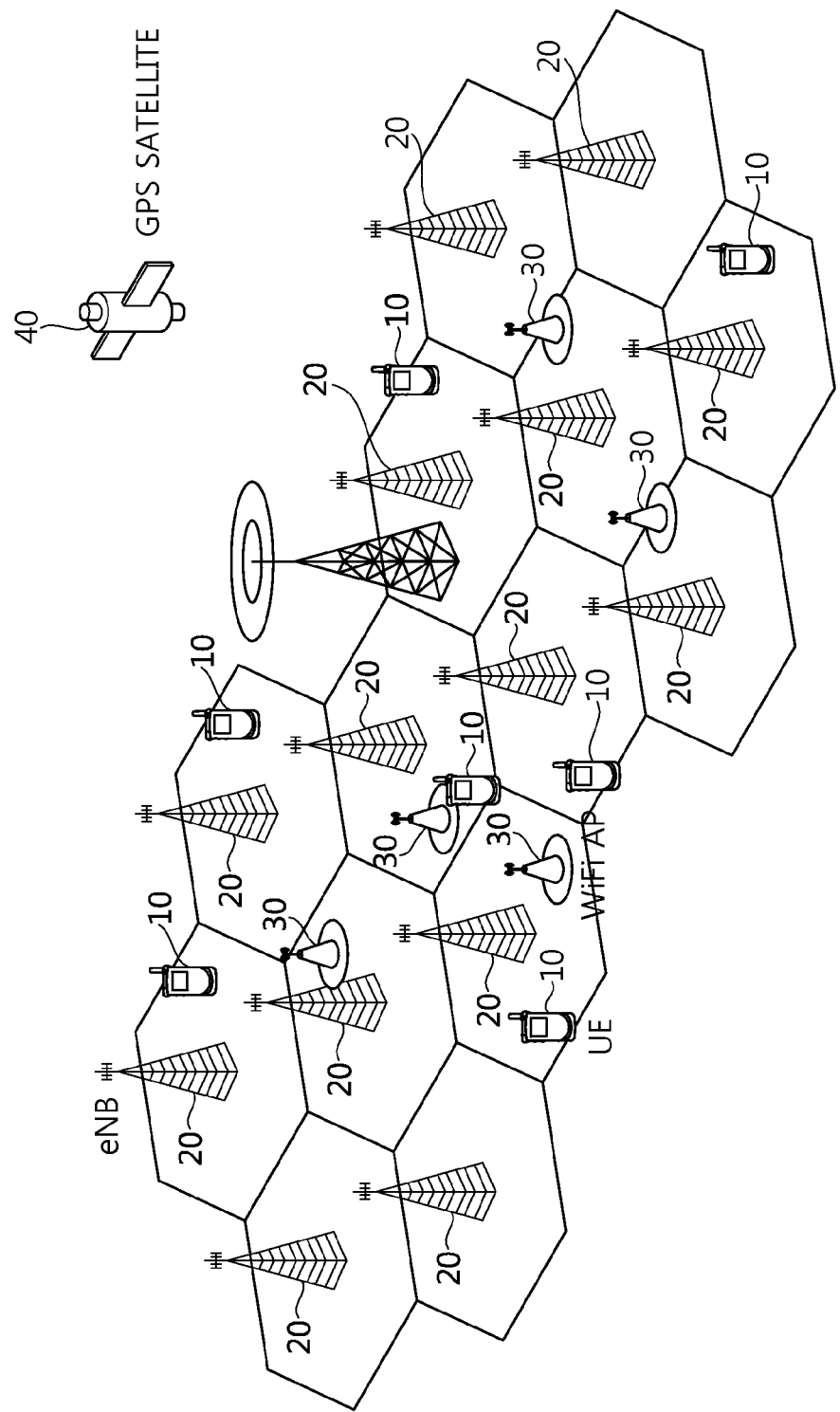
FIG. 1 illustrates a wireless communication system according to exemplary embodiments of the present invention.

Hereinafter, in this specification, some exemplary embodiments will be described in detail with reference to the accompanying drawings. In adding reference numerals to components throughout the drawings, it is to be noted that like reference numerals designate like components even though components are shown in different drawings. Further, in describing the present invention, well-known functions or constructions will not be described in detail since they may unnecessarily obscure the understanding of the present invention.

Further, in describing components of the specification, terms such as first, second, A, B, (a), (b), and like may be used. These terms are just used to discriminate the components from other components and a property, an order, or a sequence of the corresponding component is not limited by the term. It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening there between.

FIG. 1 illustrates a wireless communication system according to exemplary embodiments of the present invention.

Referring to FIG. 1, the wireless communication system is widely placed in order to provide various communication services including voice, packet, data, and the like, and includes a terminal (also may called as a user equipment (UE)) 10, a base station (called as a evolved NodeB (eNB) or BS) 20, a wireless LAN access point (AP) 30, a global positioning system (GPS) 40, and a satellite. Herein, a wireless LAN is a device supporting IEEE 802.11 technology which a wireless standard and the IEEE 802.11 may be mixed with a WiFi system.

The UE 10 may be positioned in coverage of a plurality of networks including a cellular network, a wireless LAN broadcast network, a satellite system, and the like. The UE 10 is provided with a plurality of wireless transceivers in order to access various networks and various services regardless of place and time. For example, a smart phone is provided with long term evolution (LTE), WiFi Bluetooth transceiver, and a GPS receiver.

Hereinafter, a downlink (DL) indicates communication from the eNB 20 and an uplink (UL) indicates communication from the UE 10 to the eNB 20. In the downlink, a transmitter may be a part of the eNB 20 and a receiver may be a part of the UE 10. In the uplink, the transmitter may be a part of the UE 10 and a receiver may be a part of the eNB 20.

The UE 10 may be fixed or have mobility, and may be called other terms such as a mobile station (MS), a user terminal (UT), a subscriber station (SS), a mobile terminal (MT), a wireless device, and the like. The eNB 20 indicates a fixed station that communicates with the UE 10 and may be called other terms such as a base station (BS), a base transceiver system (BTS), an access point, a femto base station (BS), a relay, and the like.

Multiple access techniques applied to the wireless communication system are not limited. Various multiple access techniques such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA may be used. In uplink transmission and downlink transmission, a time division duplex (TDD) scheme in which transmission is performed by using different times may be used or a frequency division duplex (FDD) scheme in which transmission is performed by using different frequencies may be used.

Figure 2:
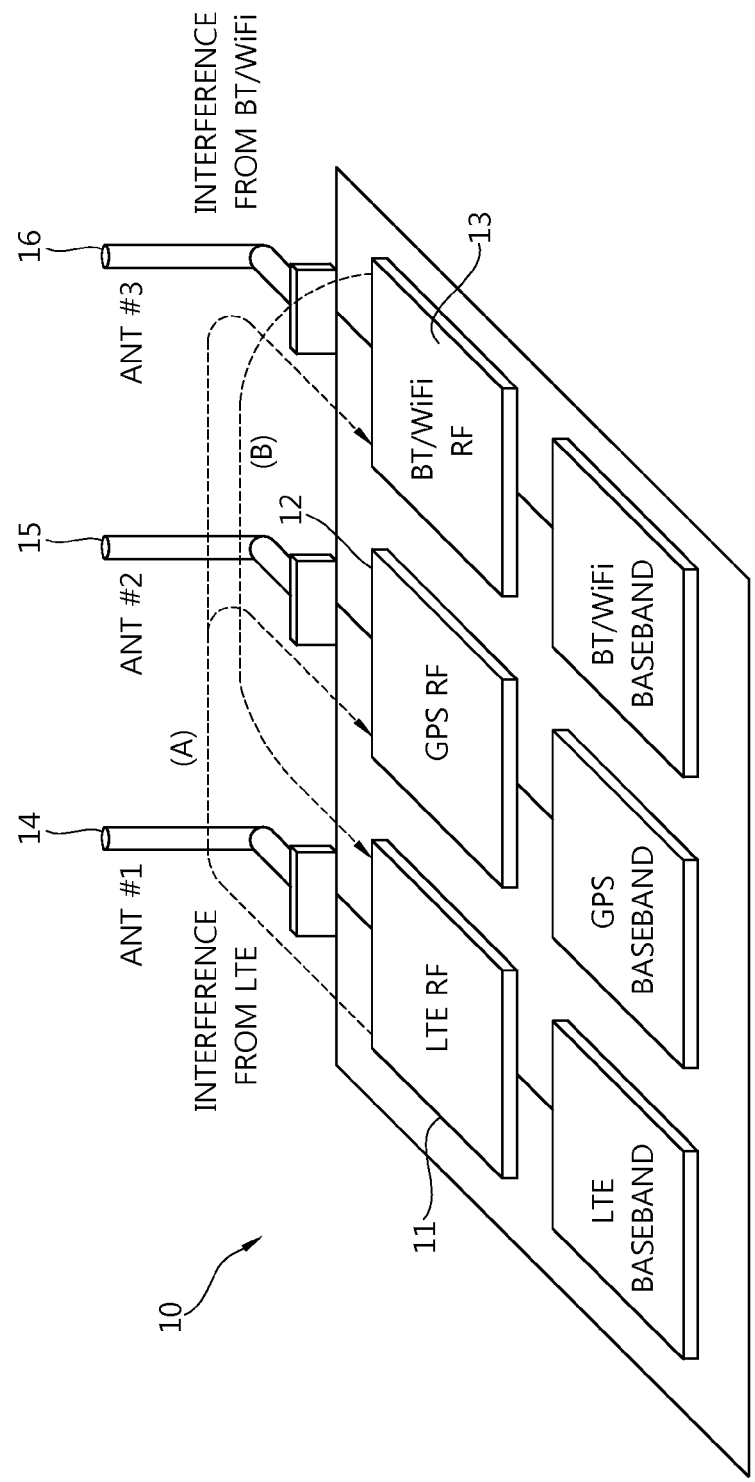
FIG. 2 is an explanatory diagram describing in-device coexistence interference.

FIG. 2 is an explanatory diagram describing in-device coexistence interference.

Referring to FIG. 2, the UE 10 includes an LTE RF 11, a GPS RF 12, and a Bluetooth/WiFi RF 13. Transceiving antennas 14, 15, and 16 are connected to the respective RFs. That is, various types of RFs are closely mounted in one device platform. Herein, transmission power of one RF may be much larger than a reception power level into another RF receiver. In this case, if an interval in frequency between the RFs is not sufficient and a filtering technique is not supported, a transmission signal of any RF may cause remarkable interference in a receiver of another RF within the device. For example, 'A' is an example in which the transmission signal of the LTE RF 11 causes the in-device coexistence interference in the GPS RF 12 and the Bluetooth/WiFi RF 13 and 'B' is an example in which the transmission signal of the Bluetooth/WiFi RF 13 causes the in-device coexistence interference in the LTE RF 11.

Figure 3:
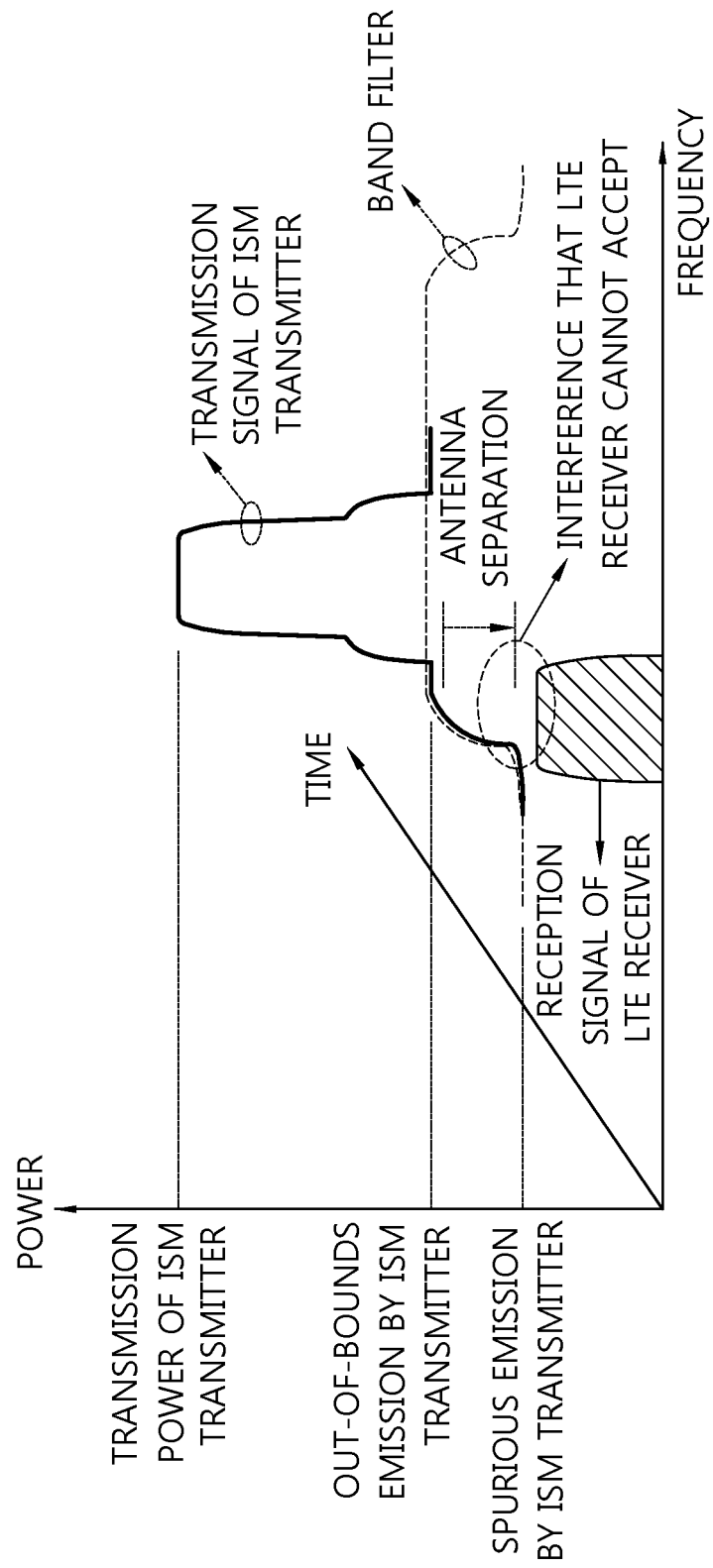
FIG. 3 is an example illustrating the in-device coexistence interference from an industrial, scientific and medical (ISM) transmitter to an LTE receiver.

FIG. 3 is an example illustrating the in-device coexistence interference from an industrial, scientific and medical (ISM) transmitter to an LTE receiver. The ISM band indicates a band which may be arbitrarily used without authorizing the use in industrial, scientific, and medical fields.

Referring to FIG. 3, a band of a signal received by the LTE receiver overlaps with a band of a transmission signal of the ISM transmitter. In this case, the in-device coexistence interference may occur.

Figure 4:
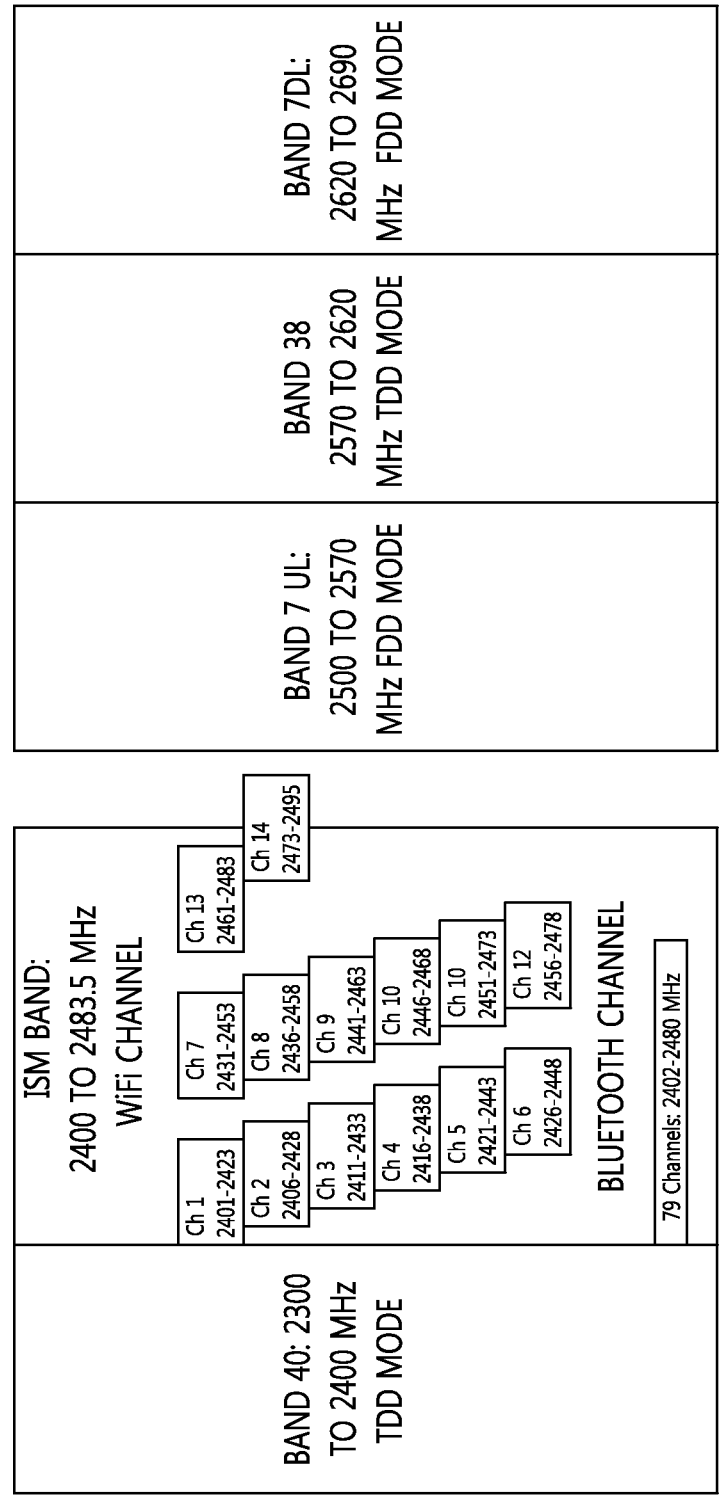
FIG. 4 is an example in which a band is divided into an ISM band and an LTE band on a frequency band.

FIG. 4 is an example in which a band is divided into an ISM band and an LTE band on a frequency band.

Referring to FIG. 4, a band 40, a band 7, and a band 38 are LTE bands. The band 40 occupies a band in the range of 2300 to 2400 MHz in a TDD mode and the band 7 occupies a band in the range of 2500 to 2570 MHz as the uplink in an FDD mode. In addition, the band 38 occupies a band in the range of 2570 to 2620 MHz in the TDD mode. Meanwhile, the ISM band is used as a WiFi channel and a Bluetooth channel, and occupies a band in the range of 2400 to 2483.5 MHz. Herein, a condition in which the in-device coexistence interference occurs is illustrated in Table 1 below.

TABLE 1

| Interference band | Pattern of interference |
| --- | --- |
| Band 40 | ISM Tx -> LTE TDD DL Rx |
| Band 40 | LTE TDD UL Tx -> ISM Rx |
| Band 7 | LTE FDD UL Tx -> ISM Rx |
| Band 7/13/14 | LTE FDD UL Tx -> GPS Rx |

Referring to Table 1, a mark of 'a->b' in the interference pattern illustrates a condition in which a transmitter a causes the in-device coexistence interference to a receiver b. Therefore, in the band 40, the ISM transmitter causes the in-device coexistence interference to an LTE-band downlink TDD receiver (LTE DL TDD Rx). The in-device coexistence interference may be alleviated to some extent by a filtering scheme, but is not sufficient to alleviate the in-device coexistence interference. When a frequency division multiplex (FDM) scheme is additionally applied to the filtering scheme, the in-device coexistence interference may be more efficiently alleviated.

Figure 5:
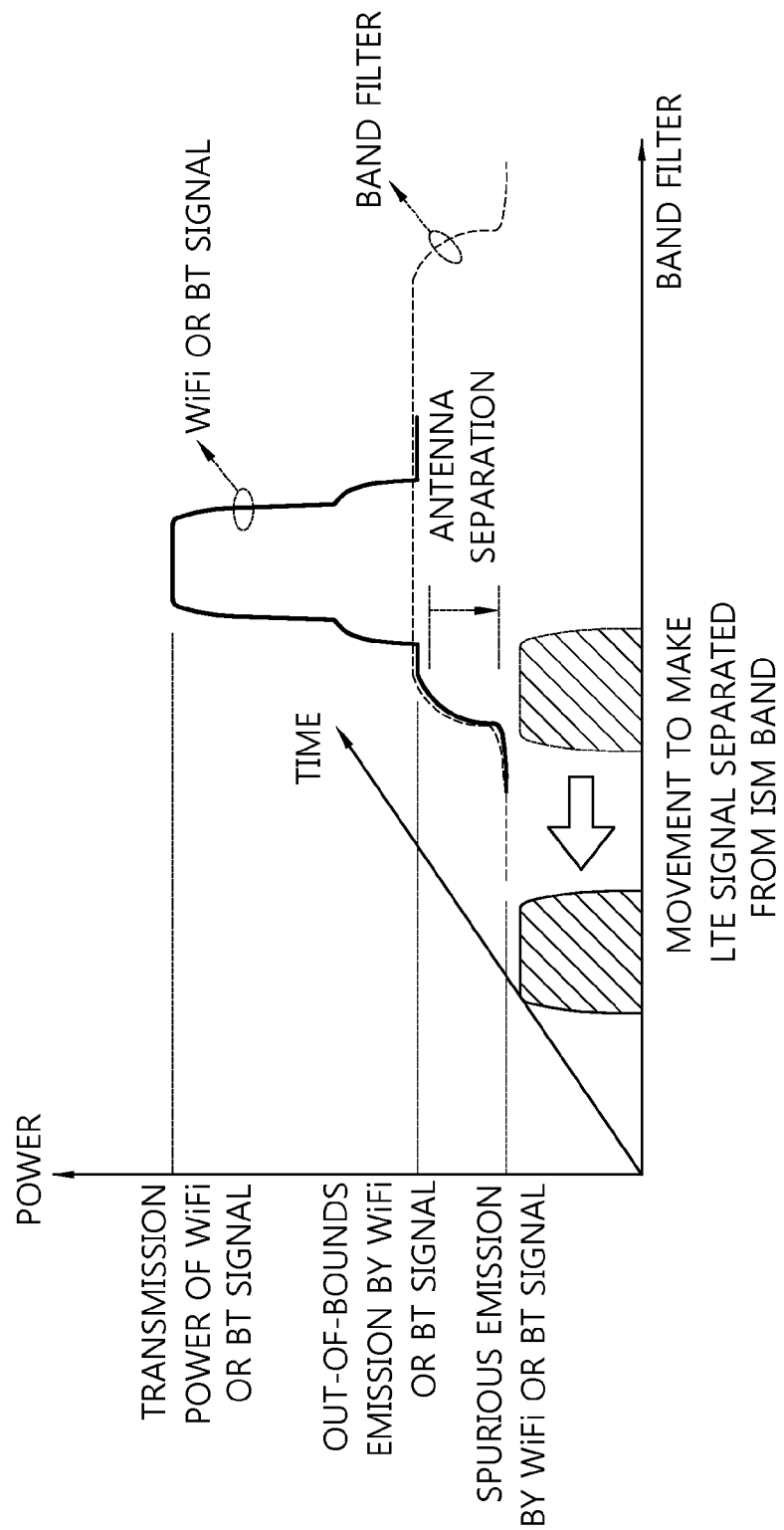
FIG. 5 is an explanatory diagram illustrating one example of alleviating the in-device coexistence interference by using an FDM scheme according to the present invention.

FIG. 5 is an explanatory diagram illustrating one example of alleviating the in-device coexistence interference by using an FDM scheme according to the present invention.

Referring to FIG. 5, the LTE band may be moved so as to prevent the LTE band and the ISM band from overlapping with each other. As a result, a handover of the terminal is induced from the ISM band. However, to this end, a method in which legacy measurement or new signaling accurately triggers a mobility procedure or a radio link failure (RLF) procedure is required. Alternatively, a part which becomes a problem associated with the ISM in the LTE band may be avoided through a filtering or resource allocation technique. Alternatively, overlapping interference may be avoided with respect to a case in which LTE carriers are compiled through a procedure of reconfiguring a set of used carriers.

Figure 6:
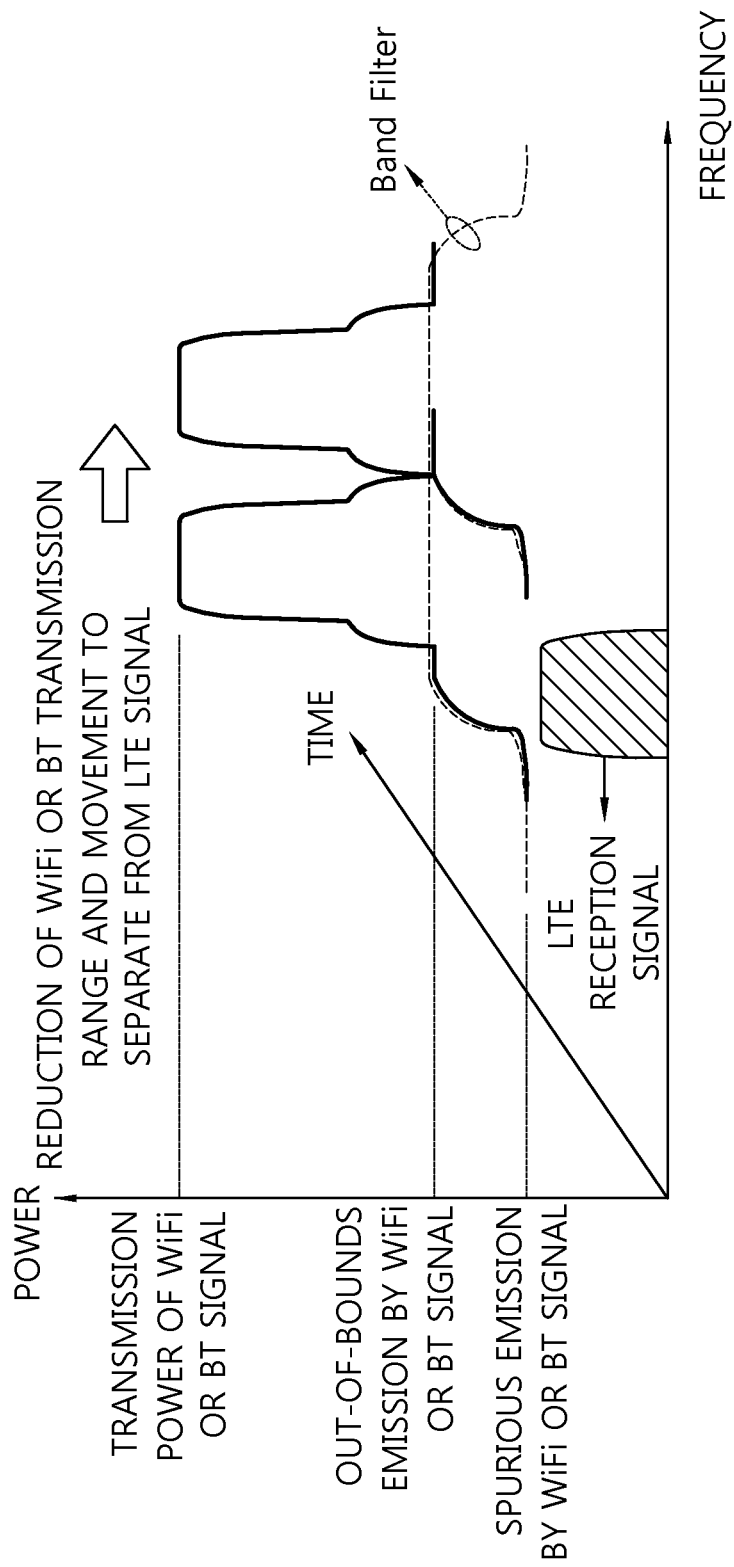
FIG. 6 is an explanatory diagram illustrating another example of alleviating the in-device coexistence interference by using the FDM scheme according to the present invention.

FIG. 6 is an explanatory diagram illustrating another example of alleviating the in-device coexistence interference by using the FDM scheme according to the present invention.

Referring to FIG. 6, the ISM band may be reduced and moved so as to be spaced apart from the LTE band. However, in this scheme, backward compatibility problem may occur. In the case of the Bluetooth, the backward compatibility problem may be resolved due to an adaptive frequency hopping mechanism to some extent, but in the case of the WiFi, it may be difficult to resolve the backward compatibility problem.

Figure 7:
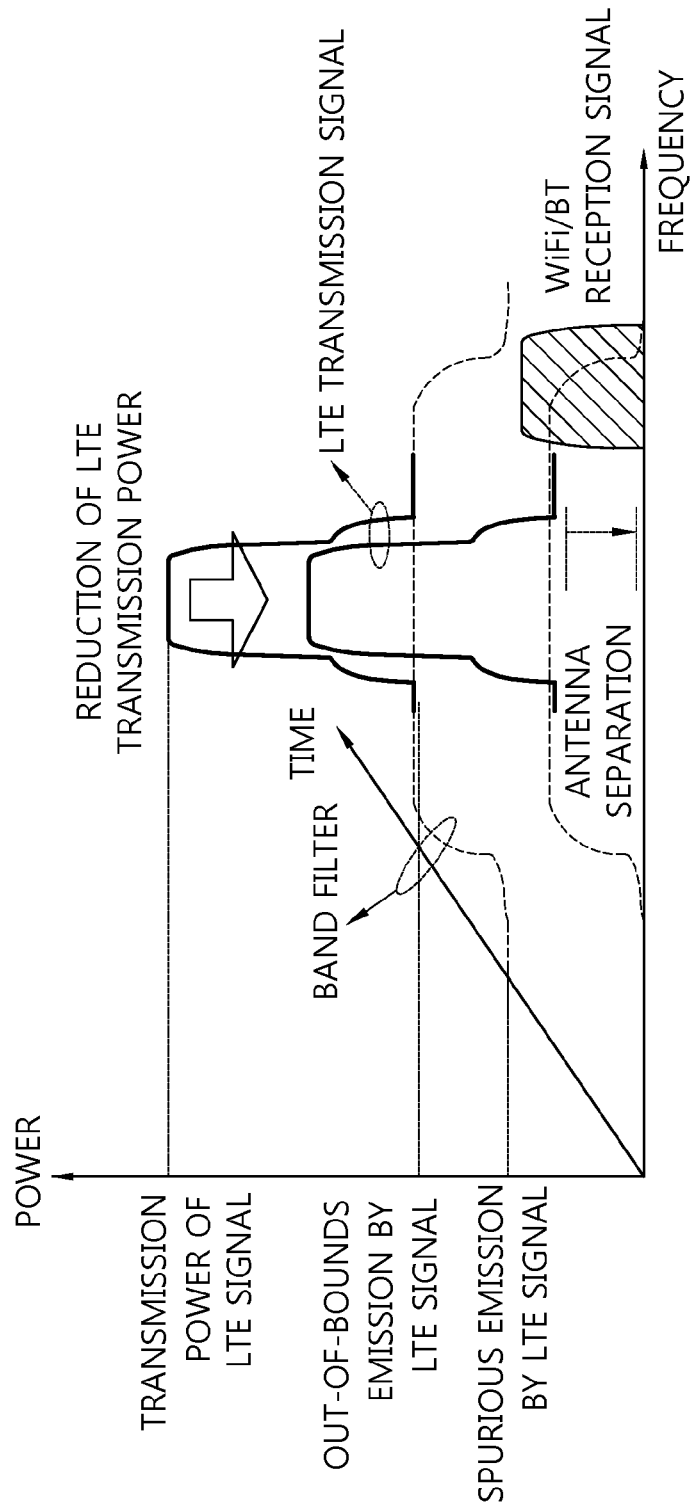
FIGS. 7 and 8 are explanatory diagrams illustrating one example of alleviating the in-device coexistence interference by using a power control (PC) scheme according to the present invention.
Figure 8:
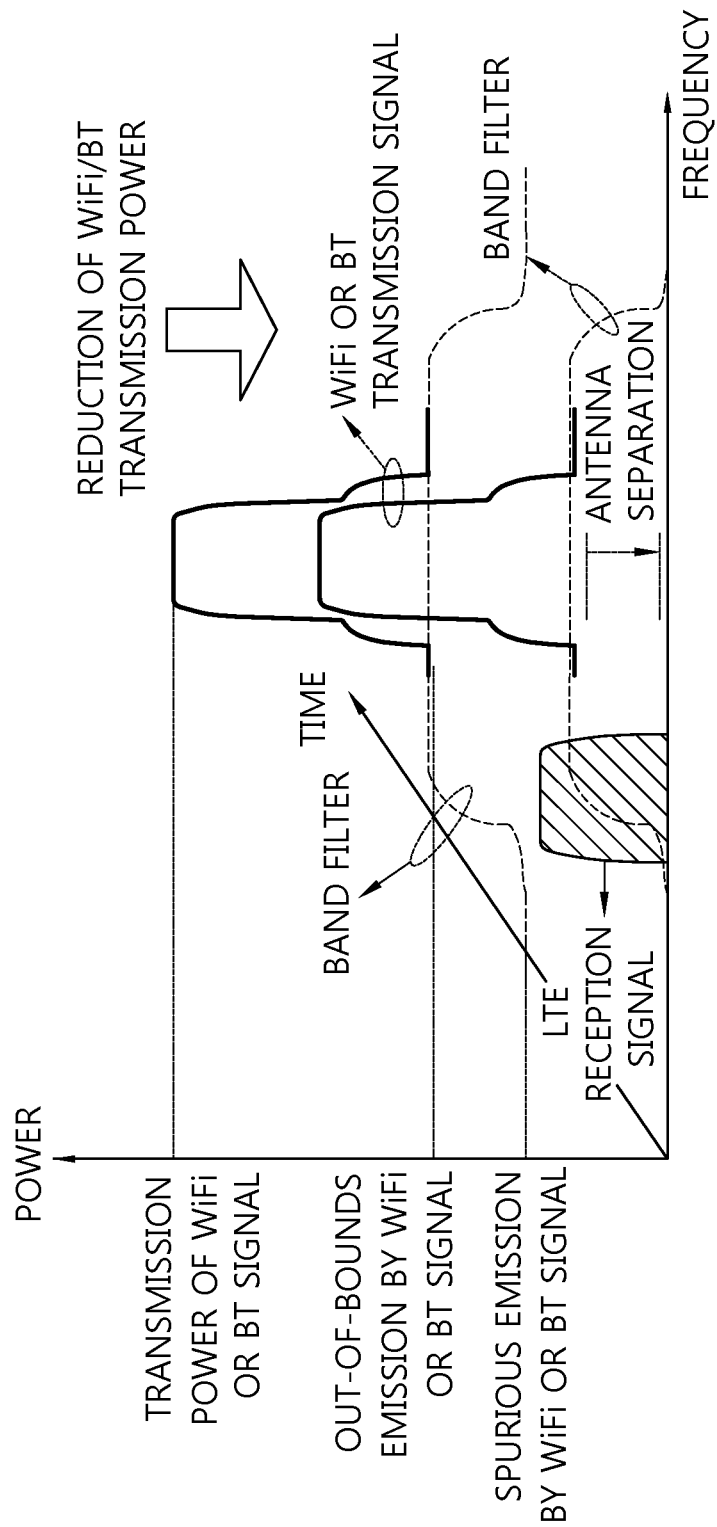

FIGS. 7 and 8 are explanatory diagrams illustrating one example of alleviating the in-device coexistence interference by using a power control (PC) scheme according to the present invention.

Referring to FIG. 7, the terminal avoids the in-device coexistence interference by lowering transmission power of the LTE signal by a predetermined level to improve reception quality of the ISM band and referring to FIG. 8, the terminal avoids the in-device coexistence interference by lowering transmission power of the ISM band by a predetermined level to improve reception quality of the LTE signal.

Figure 9:
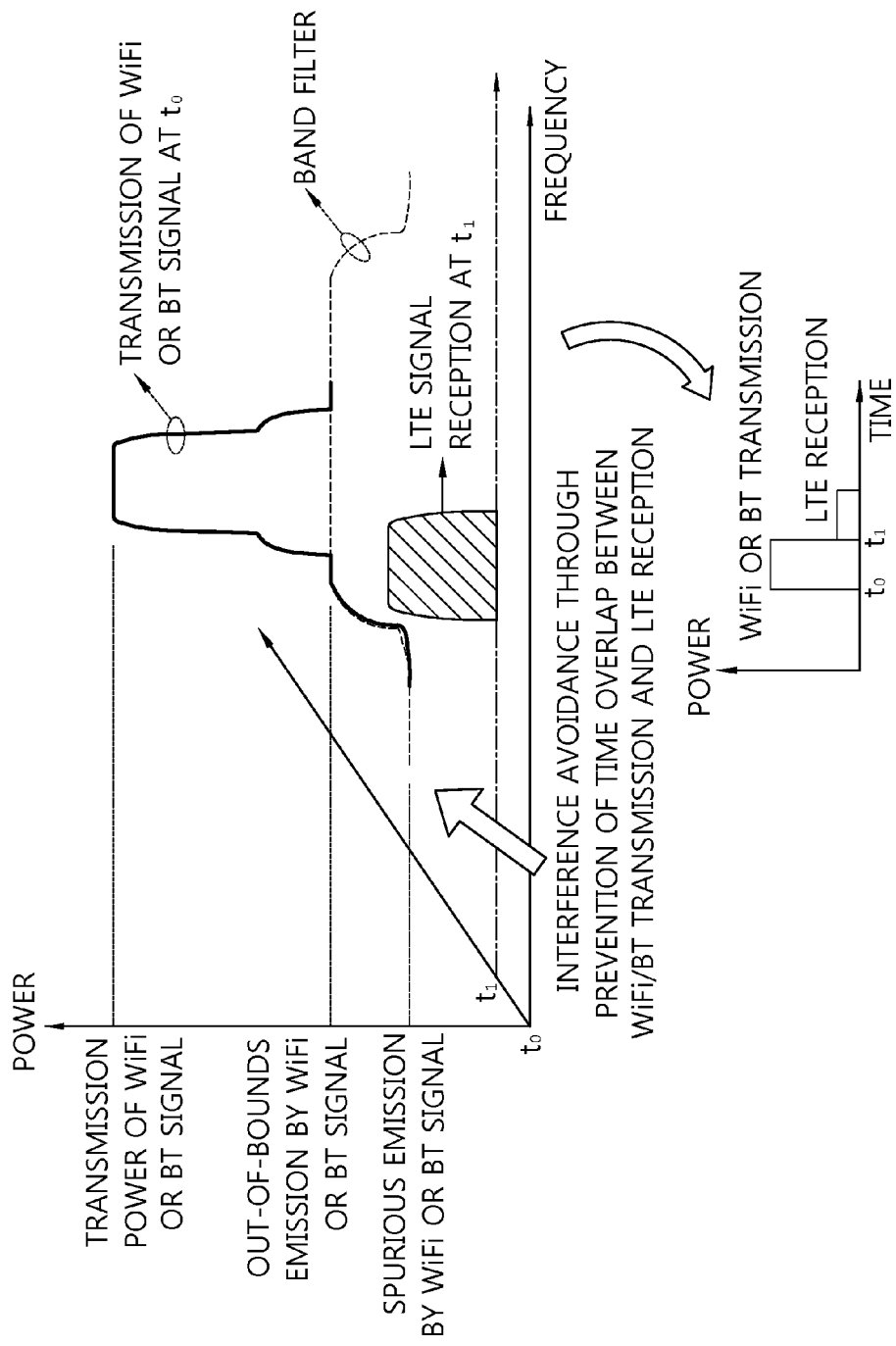
FIG. 9 is an explanatory diagram illustrating one example of alleviating the in-device coexistence interference according to the present invention.

FIG. 9 is an explanatory diagram illustrating one example of alleviating the in-device coexistence interference according to the present invention.

Referring to FIG. 9, when a reception time of the LTE signal is prevented from overlapping with a transmission time in the ISM band, the in-device coexistence interference may be avoided. For example, when the signal in the ISM band is transmitted at t0, the LTE signal is received at t1.

Figure 10:
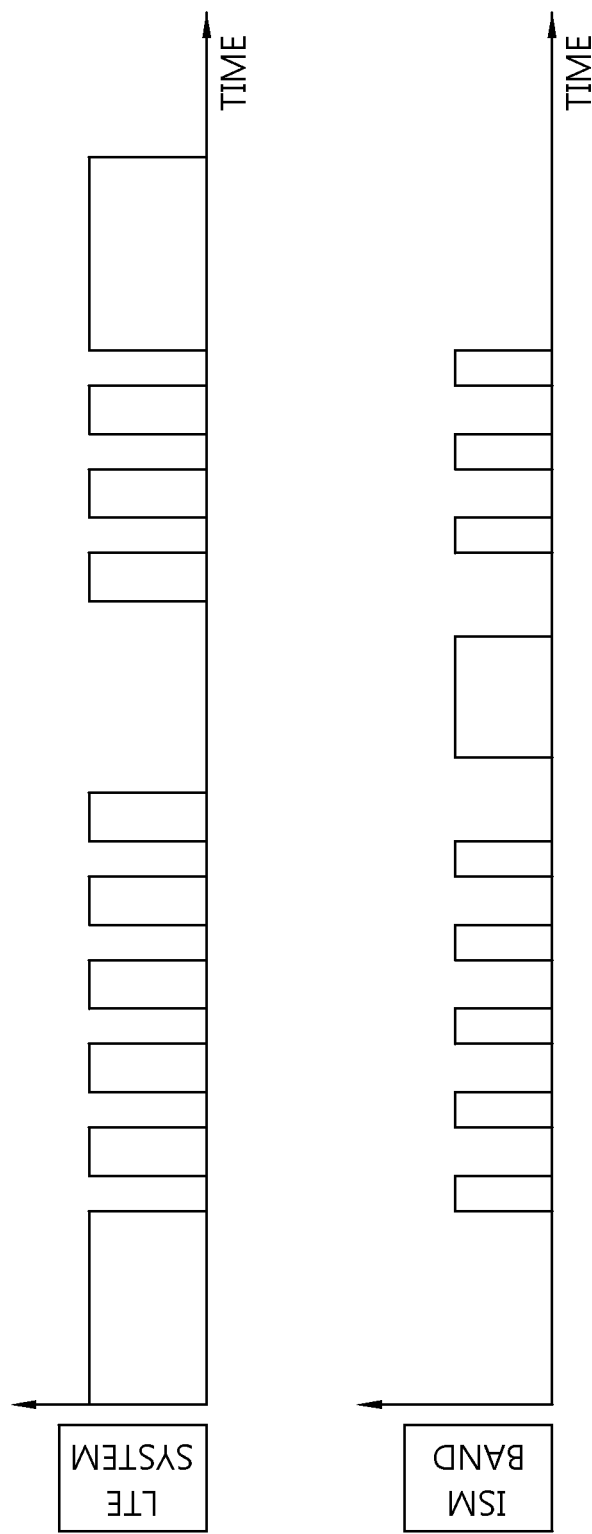
FIG. 10 is an explanatory diagram illustrating one example of transmission/reception timings on time axes in the LTE band and the ISM band using the TDM scheme according to the present invention.

FIG. 10 is an explanatory diagram illustrating one example of transmission/reception timings on time axes in the LTE band and the ISM band using the TDM scheme according to the present invention.

Referring to FIG. 10, the in-device coexistence interference may be avoided without movement between the LTE band and the ISM band by using the scheme of FIG. 9.

Figure 11:
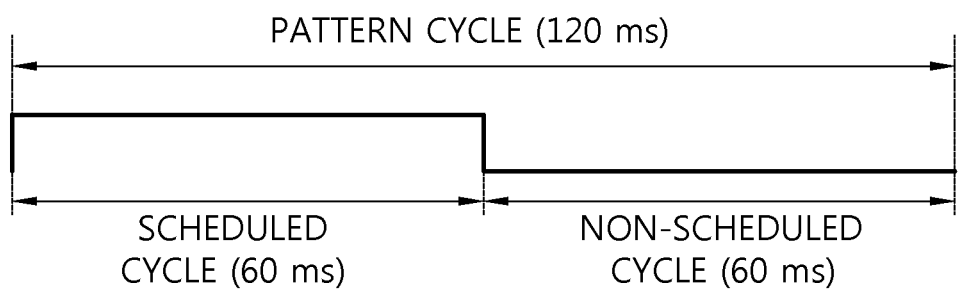
FIG. 11 is a diagram illustrating another example of alleviating the in-device coexistence interference according to the present invention.

FIG. 11 is a diagram illustrating another example of alleviating the in-device coexistence interference according to the present invention.

Referring to FIG. 11, a predetermined pattern periodicity interval is divided into a scheduled period interval and an unscheduled period interval to avoid the in-device coexistence interference by the TDM scheme based on discontinuous reception (DRX).

Mutual interference between the LTE and the ISM is avoided by preventing the LTE from being transmitted within the unscheduled period interval. However, primary LTE transmission such as random access and hybrid automatic repeat request (HARQ) retransmission may be permitted even within the scheduled period interval.

Mutual interference between the LTE and the ISM is avoided by preventing the ISM from being transmitted and permitting the LTE to be transmitted within the scheduled period interval. The primary ISM transmission such as Beacon or WiFi may be permitted even within the scheduled period interval, similarly as the unscheduled period interval.

The LTE transmission may be prevented in order to protect the primary ISM transmission. Special signaling for protecting the primary ISM transmission such as Beacon may be added. As one example, a period of the Beacon signaling and information on a subframe offset may be added. In this case, the subframe offset number and the system frame number may be determined based on '0'. The system frame number may have one of '0' to '1023' by the unit of a radio frame in the LTE system. One radio frame is constituted by ten subframes. When the corresponding subframe offset number and system frame number are known, an accurate frame position may be known in the corresponding system. The corresponding period or offset may be used as information to choose proper DRX period of DRX offset.

Figure 12:
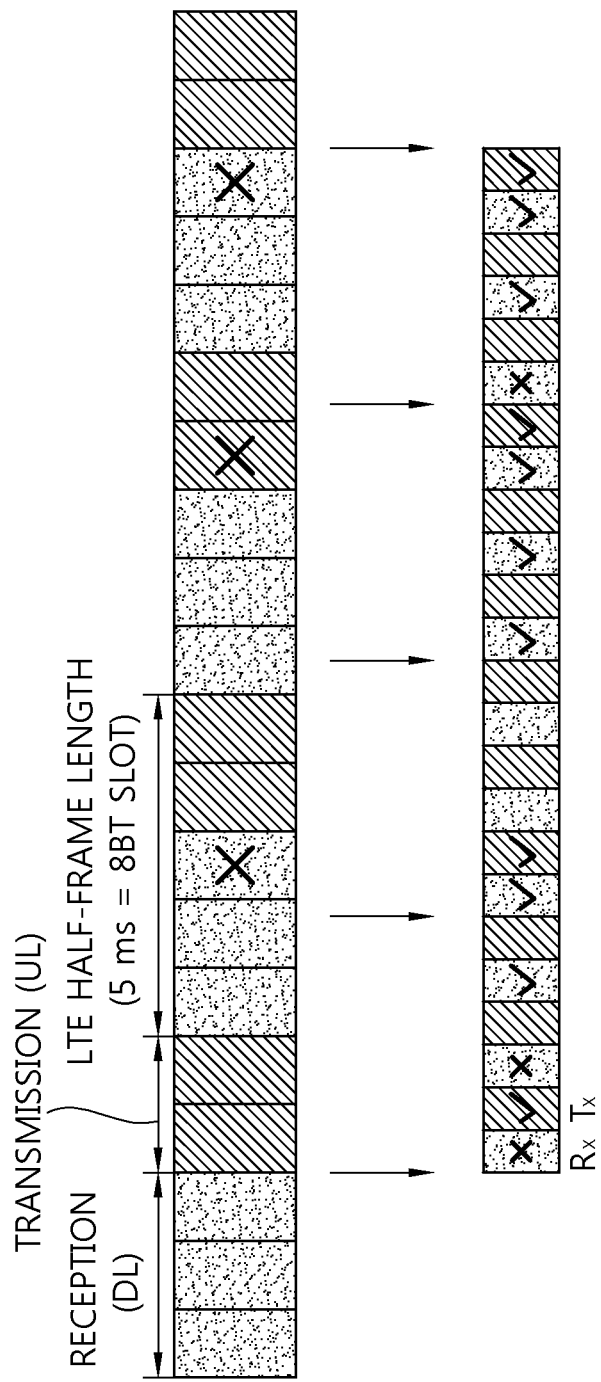
FIG. 12 is a diagram illustrating yet another example of alleviating the in-device coexistence interference according to the present invention.

FIG. 12 is a diagram illustrating yet another example of alleviating the in-device coexistence interference according to the present invention.

Referring to FIG. 12, by an autonomously denial scheme, when the in-device coexistence interference occurs in the terminal, transmission of the LTE is denied in order to protect the reception of the ISM. Herein, a ticked part means that transmission or reception is approved and a part marked by 'X' means that transmission or reception is denied. As an example, even though UL transmission is granted from the base station, the terminal denies granting not to perform UL transmission in order to protect the reception of the ISM. Similarly, transmission of the ISM is denied in order to protect the reception of the LTE.

Figure 13:
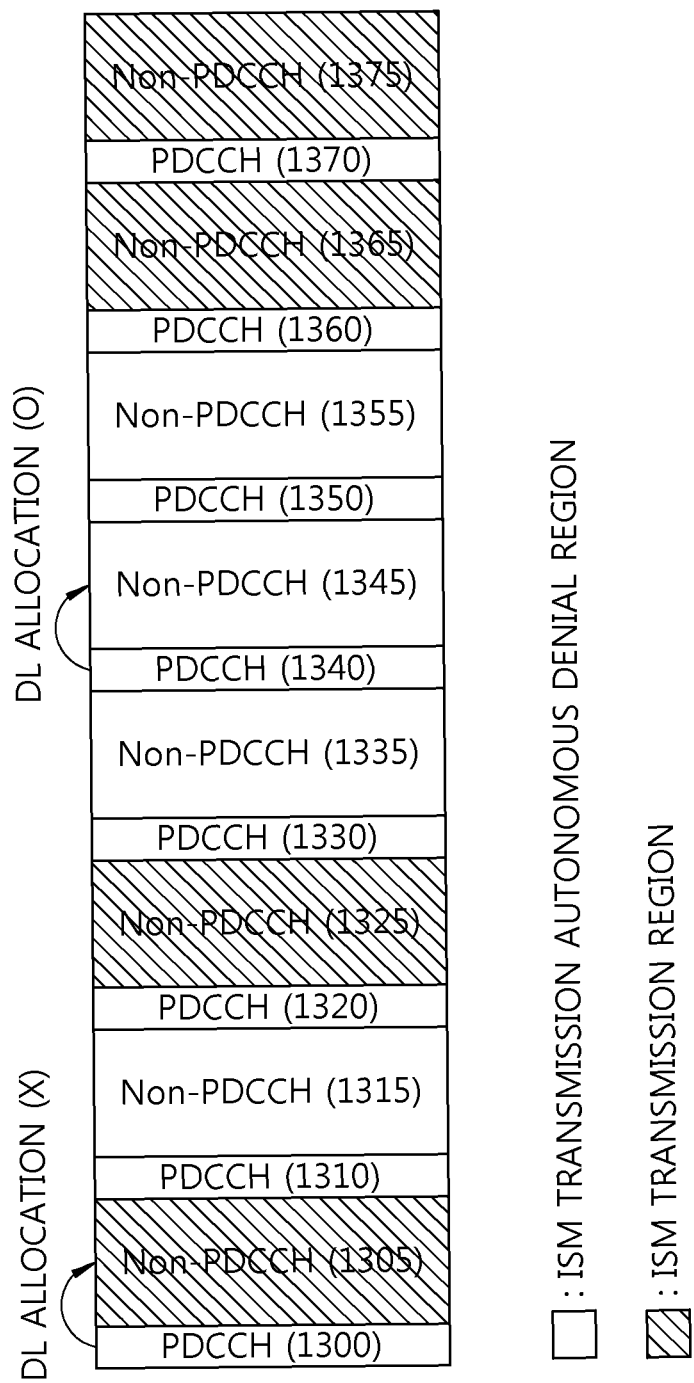
FIG. 13 is a diagram illustrating yet another example of alleviating the in-device coexistence interference according to the present invention.

FIG. 13 is a diagram illustrating yet another example of alleviating the in-device coexistence interference according to the present invention.

Referring to FIG. 13, by an partially autonomously denial scheme, transmission of the LTE subframe is partially denied based on a Physical Downlink Control Channel (PDCCH) in order to protect the reception of the ISM.

In principle, a UE denies ISM transmission when receiving PDCCH region of LTE. However, if downlink resource allocation is not existed in subframe ordered by PDCCH region, ISM transmission is not needed to denied but permitted in the PDCCH region. Here, the PDCCH region means a region combining a resource region including control information such as resource allocation or grant and a region needed to decode the control information.

In LTE case, PDCCH region means combining the number of OFDM symbol used for transmitting PDCCH which is transmitted by Physical Control Format Indicator Channel (PCFICH) and a region needed to decode PDCCH in the UE.

At this time, the size of the region needed to decode PDCCH in the UE may be changed based on the UE implementation, but may not be over one subframe.

In each of PDCCH region (1300, 1310, 1320, 1330, 1340, 1350, 1360, 1370), ISM transmission may be denied.

Also, a UE judges whether downlink resource allocation exists in non-PDCCH region (1305, 1315, 1325, 1335, 1345, 1355, 1365, 1375) which is indicated by each of PDCCH region (1300, 1310, 1320, 1330, 1340, 1350, 1360, 1370).

In non-PDCCH region (1315, 1335, 1345, 1355), downlink resource allocation exists in non-PDCCH region. However, in non-PDCCH region (1305, 1325, 1365, 1375) downlink resource allocation is not existed in non-PDCCH region.

That is, in some of non-PDCCH region, ISM transmission is partially denied. In others of non-PDCCH region (1305, 1325, 1365, 1375), ISM transmission is permitted.

Figure 14:
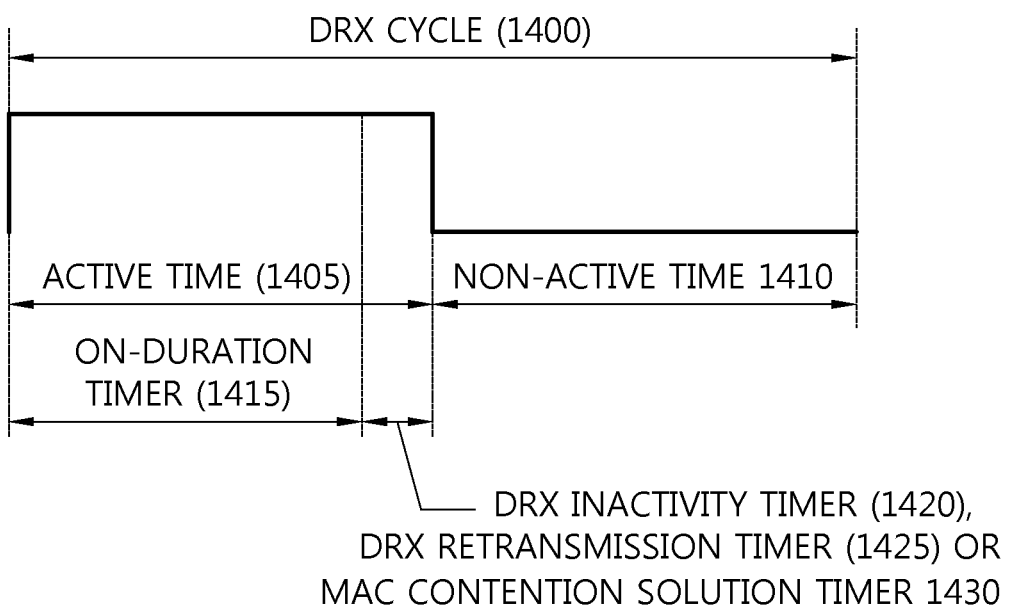
FIGS. 14 and 15 show an example of a DRX operation according to the present invention.
Figure 15:
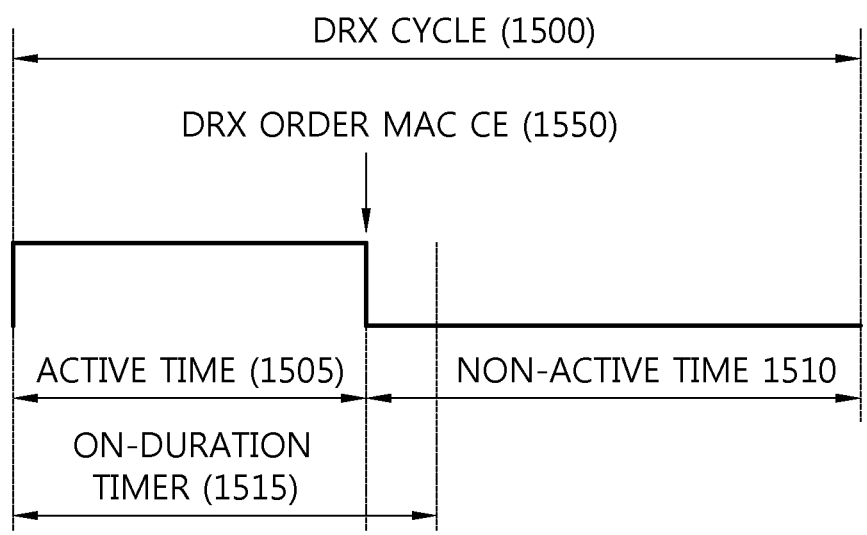

FIGS. 14 and 15 show an example of a DRX operation according to the present invention.

Referring to FIG. 14, a DRX cycle 1400 means a cycle in which the DRX operation is performed, and as one example, there is a long DRX cycle, which is applied in the range between 10 subframes to 2560 subframes, and as another example, there is a short DRX cycle, which is applied in the range of 2 subframes to 640 subframes. In this case, the short DRX cycle is applied for the DRX operation only while a DRX short cycle timer (drxShortCycleTimer) operates, and in the range falling outside of the DRX short cycle timer, the long DRX cycle is applied. Here, the basic unit of the DRX short cycle timer is one short DRX cycle. That is, if the length of the short DRX cycle is 10, the time becomes "10×drxShortCycleTimer". At this time, the range of the length of the short DRX cycle is from 1 to 16.

The active time 1405 means the total time during which a terminal is awake to receive the PDCCH. The active time means the time during which an on-duration timer 1415 of the terminal operates, or time which additionally includes time during which a timer, such as a DRX inactivity timer (drxInactivityTimer) 1420, a DRX retransmission timer (drx-RetransmissionTimer) 1425, or a MAC contention resolution timer (mac-ContentionResolutionTimer) 1430, is operated.

A non-active time 1410 means time that is not the active time 1405 of the DRX cycle 1400.

The timer unit of the DRX timer, such as the on-duration timer 1415, the DRX inactivity timer 1420, or the DRX retransmission timer 1425, is a PDCCH subframe (psf). That is, the DRX timer is signaled or operated in a PDCCH subframe. Here, the PDCCH subframe means a subframe that includes the PDCCH. For example, in a TDD configuration, DL subframes and downlink pilot time slot (DwPTS) subframes correspond to PDCCH subframes. The subframes that are configured with respect to a relay node (RN) but are not suspended correspond to the PDCCH subframes.

Referring to FIG. 15, while the on-duration timer 1515 is operated in the DRX cycle 1500, the active time 1505 is configured as long as a DRX command MAC CE (DRX command MAC Control Element) 1550 is not received, and if the DRX command MAC CE 1550 is received, the on-duration timer 1515 is stopped, and the non-active time 1510 is configured. The length of the on-duration timer 1515 is in the range of psf1 to psf200, that is, in the range from one PDCCH subframe to 200 PDCCH subframes.

The DRX inactivity timer starts when a PDCCH that indicates new transmission is received, and is stopped when the DRX command MAC CE is received.

The DRX retransmission timer starts when data decoding is not successfully performed in the corresponding HARQ procedure in a HARQ RTT (Round Trip Time). If a PDCCH that includes a grant message is received with respect to the corresponding process, the DRX retransmission timer is stopped.

On the other hand, if CQI masking is configured by upper-layer signaling, transmission of CQI, PMI (Precoding Matrix Index), RI (Rank Indicator), or PTI (Precoding Type Indicator) is not permitted outside the operating range of the on-duration timer. By contrast, if CQI masking is not configured, the transmission of CQI, PMI, RI, or PTI is permitted in the active time rather than the operating cycle of the on-duration timer. Even outside the operating range of the on-duration timer, the transmission of the CQI, PMI, RI, or PTI may be permitted during the operating cycle of another timer, or during the active time, which is determined by a scheduling request operation or a random access operation.

In the scheduling request (SR) operation, the DRX active time is configured until the corresponding scheduling request is solved in the situation in which the scheduling request is pending. Here, the situation in which the scheduling request is pending (or outstanding) means the state in which data to be sent from a terminal to an uplink exist, but since resources for the corresponding uplink transmission have not been granted, the data accumulate without being transmitted. Unless the corresponding resources are not properly granted, the corresponding pending state is maintained, and the DRX active time is also maintained. That is, in the situation in which the scheduling request is pending, even if the above-described timers have expired, the DRX active time is configured until the corresponding scheduling is solved.

In a random access (RA) operation, the DRX exerts no influence on the transmission of a preamble or on the reception of a random access response (RAR). The reception of a message 3 (Msg3), which is a message that includes a C-RNTI MAC CE (Cell-Radio Network Temporary Identifier MAC Control Element) or a CCCH SDU (Common Control Channel Service Data Unit) and is transmitted through a UL-SCH (Uplink-Shared Channel), is protected during the active time by the MAC-contention resolution timer (mac-ContentionResolutionTimer). In the non-contention random access, the active time is extended until the PDCCH constructed by C-RNTI is newly received after the RAR is received. That is, the PDCCH indicating that new transmission is addressed to the C-RNTI of the terminal is received in the terminal after the RAR of the preamble is successfully received in the terminal.

Now, according to the present invention, a method for controlling in-device coexistence interference will be described. Hereinafter, operations of reducing, avoiding, or removing interference are respectively called interference control, interference coordination, or interference resolution.

Scenarios depicting possible states of on-going in-device coexistence interference (IDC) of the terminal are as shown in Table 2.

TABLE 2

| Scenario | Definition |
| --- | --- |
| 1 | In-device coexistence interference is occurring in a serving frequency band. |
| 2 | Latent in-device coexistence interference exists in a serving frequency band (in-device coexistence interference is not currently occurring). |
| 3 | In-device coexistence interference is occurring in a frequency band that is not the serving frequency band. |
| 4 | Latent in-device coexistence interference exists in a frequency band that is not the serving frequency band (in-device coexistence interference is not currently occurring). |

Each scenario indicates the interference type and the interference state based on the frequency band. Since the unusable frequency is not related to whether the frequency band is the serving frequency band, scenario 1 and scenario 3 correspond to in-device coexistence interference.

Figure 16:
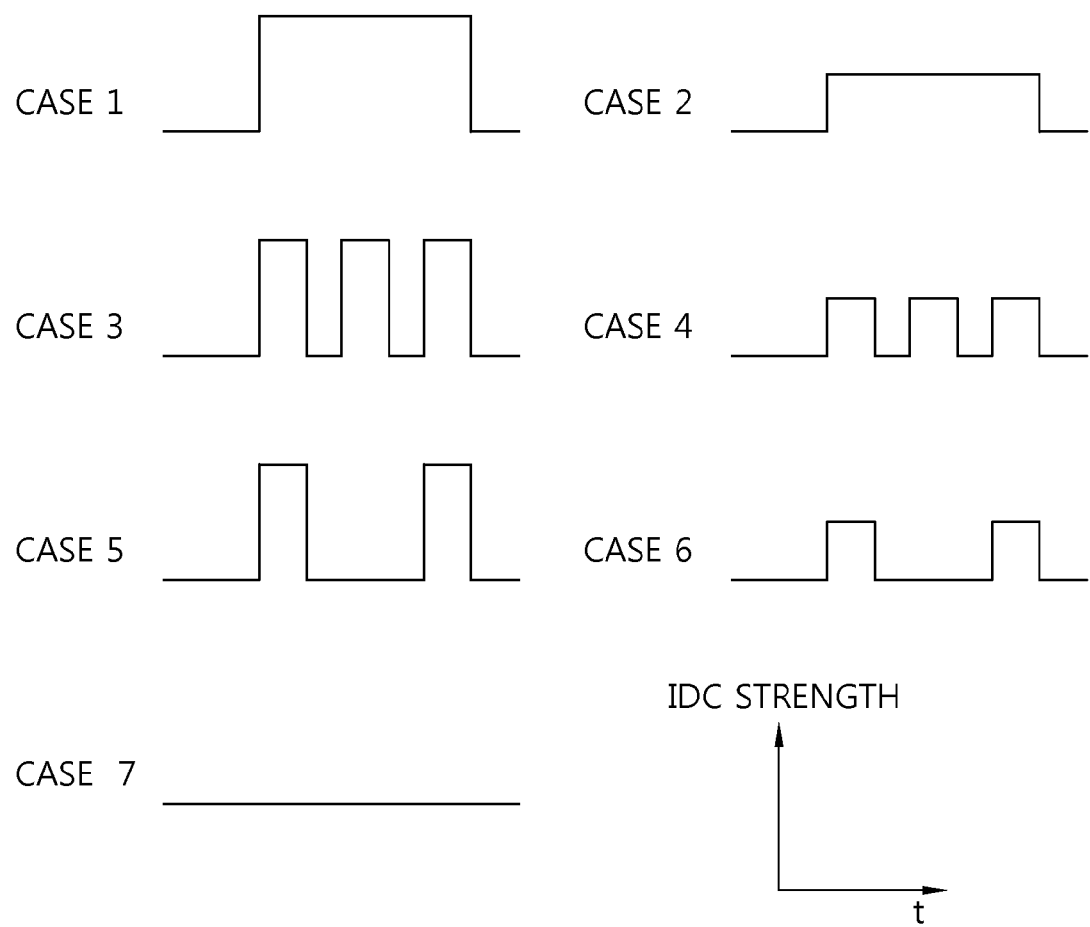
FIG. 16 shows cases where the terminal receives an in-device interference signal.

FIG. 16 shows cases where the terminal receives an in-device interference signal. These cases are classified into seven cases based on the frequency of occurrence and strength or power of interference.

Referring to FIG. 16, seven cases are classified into four patterns based on the frequency of occurrence of interference. That is, case 1 and case 2 correspond to a continuous pattern, case 3 and case 4 correspond to a bursty pattern, case 5 and case 6 correspond to a sparse pattern, and case 7 corresponds to a nonexistent pattern.

The seven cases are classified into three patterns based on the strength of interference. That is, case 1, case 3, and case 5 correspond to a very strong pattern, case 2, case 4, and case 6 correspond to an enough weak pattern, and case 7 corresponds to a nonexistent pattern.

As examples, cases where it is determined that in-device coexistence interference of the terminal is occurring may be case 1 and case 3. The cases are cases where the interference is continuous or bursty, and the strength of interference is very strong.

On the other hand, the case in which in-device coexistence interference is not occurring but in-device coexistence interference has occurred, and additionally in which it is possible that in-device coexistence interference has changed to the on-going in-device coexistence interference is defined as "existence of latent in-device coexistence interference".

As an example, the terminal may determine that case 2, case 4, case 5, and case 6 in Table 2 correspond to the existence of latent in-device coexistence interference. As another example, the terminal may determine that case 5, in which the strength of interference is very strong, corresponds to the existence of latent in-device coexistence interference. In the frequency band in which latent in-device coexistence interference exists, handover or RRC configuration/reconfiguration is not impossible, but the terminal may perform the measurement.

Figure 17:
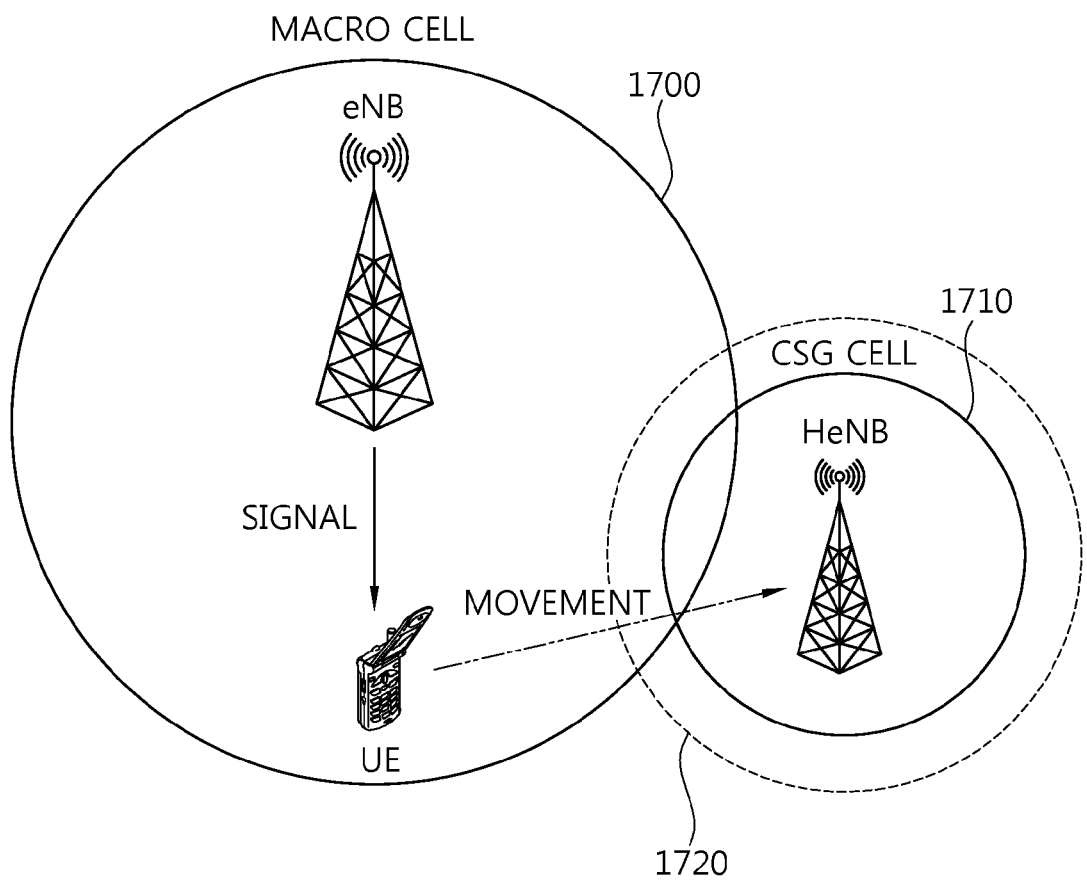
FIG. 17 is a view illustrating an example of a proximity indication operation applied to the present invention.

FIG. 17 is a view illustrating an example of a proximity indication operation applied to the present invention. If the terminal detects that the terminal approaches a region of a CSG (Closed Subscriber Group) cell (or HeNB) that has a CSG ID that is on the white list of the terminal, the terminal may transmit information (for example, system information) of the CSG cell to a source base station, which transmits and receives existing signals, such a procedure being known as "proximity indication".

Referring to FIG. 17, if the terminal that receives a signal from a first base station eNB in a macro cell 1700, which is a source base station, approaches a second base station HeNB in a CSG cell 1710, it is preferable that the terminal receive the signal from the second base station, and thus it is required to perform a cell change procedure, that is, handover.

In order for the terminal to perform the cell change procedure more smoothly, the terminal performs a proximity indication procedure. For example, if the terminal approaches a specific region 1720 near the CSG cell, the terminal transmits a proximity indication message to the first base station, that is, the source base station. Then, the terminal performs measurement in accordance with the configuration of the first base station, and sets the measurement if there is no measurement configuration for a frequency that belongs to the second station. The terminal reports system information (CGI (Cell Global ID), TAI (Tracking Area ID), and CSG ID) that the terminal has received from the second base station, which is the target base station, and system information (PCI (Physical Cell ID) that the terminal possesses to the first base station, and based on this, the cell change procedure, that is, handover, from the first base station to the second base station is performed.

Due to the proximity indication operation, it is not necessary for the first base station to needlessly request information (PCI, CGI, TAI, and CSG ID) pertaining to a CSG cell that is not adjacent thereto. Further, due to the proximity indication operation, it is not necessary for the first base station to perform the measurement configuration required for the cell change of the corresponding terminal with respect to the CSG cell that is not adjacent thereto. That is, the corresponding terminal does not perform the measurement procedure for the cell change to the corresponding CSG cell.

FIG. 18 is a flowchart illustrating an example of the operation of a terminal and a base station performing in-device coexistence interference (hereinafter referred to as "IDC") control according to the present invention.

Referring to FIG. 18, the terminal performs the IDC indication operation through transmission of the IDC indication information to the base station (S1800), and may report the measurement result performed by the terminal. As an example, the terminal is IDC-triggered based on the IDC triggering condition inside the terminal (or IDC triggering condition configured by the base station) to perform the IDC indication operation.

The IDC indication information (or IDC support information) may be indication information that is discriminated with respect to the TDM operation or FDM operation or indication information that is integrated with the TDM operation or FDM operation. The discriminated indication information with respect to the TDM operation and FDM operation may have priority such that the terminal can request the TDM operation or the FDM operation, which are IDC resolutions.

Further, the measurement result may be included in the IDC indication information. The measurement result may be used to determine which IDC resolution is more suitable. For example, if the target cell for the FDM operation has poor channel quality, the base station may select a TDM solution to solve the IDC problem of the serving cell.

As an example of the IDC indication operation, the terminal may perform the IDC indication operation by transmitting an IDC indication message 1850, which is a new message format, to the base station. The IDC indication message 1850 may be configured to perform the IDC indication only with respect to a specific frequency band.

The IDC indication message 1850 may include unusable frequency band information. The unusable frequency is a frequency in which IDC is occurring and thus it is difficult to perform wireless communication. As an example, even if WiFi of the terminal is not turned on and there is no IDC during an initial LTE connection, the band 40 in the terminal provided with WiFi is a frequency band that is possibly an unusable frequency, and thus it is determined to be a frequency band having the possibility of IDC existence. As another example, the unusable frequency band may include not only the IDC-occurring frequency band but also the latent IDC-existing frequency band.

As an example, the IDC indication message 1850 may include all EARFCN (E-UTRA Absolute Radio Frequency Channel Number) values of the unusable frequency band. Here, EARFCN means the number given to each divided operating frequency band of E-UTRA (Evolved-Universal Terrestrial Radio Access).

As another example, the IDC indication message 1850 may include the EREFCN that corresponds to a bound value of the unusable frequency band. The bound value may be an upper bound value or a lower bound value.

As still another example, the IDC indication message 1850 may include the EARFCN that corresponds to the lower bound value, and based on this, the IDC indication message may indicate that the frequency band that is larger than the lower bound value is an unusable frequency.

As still another example, the IDC indication message 1850 may include the EARFCN that corresponds to the upper bound value, and based on this, the IDC indication message may indicate that the frequency band that is smaller than the upper bound value is an unusable frequency. In this case, whether the EARFCN included in the IDC indication message 1850 is the upper bound value or the lower bound value may be predetermined through the 3GPP LTE standards. Further, an indicator indicating whether the EARFCN is the upper bound value or the lower bound value is called a bound type indicator) may be further included in the IDC indication message 1850. As still another example, the type of the bound value may be implicitly determined on the basis of the operating band region to which the EARFCN included in the IDC indication message 1850 belongs.

As still another example, the IDC indication message 1850 may indicate that the IDC indication message 1850 includes the EARFCN and the operating band region itself, in which the EARFCN is positioned, is an unusable frequency band.

As still another example, if a plurality of operating bands is influenced by the frequency band indicated by the EARFCN, the IDC indication message 1850 may be configured to indicate that all the plurality of operating bands are unusable frequency bands.

If an IDC entering indicator for indicating that the IDC-occurring state starts is not separately transmitted, and if the frequency band that is recognized as the usable frequency band by the base station through the IDC indication message 1850 is indicated as an unusable frequency band, the base station may implicitly determine that the IDC-occurring state starts with respect to the corresponding frequency band.

On the other hand, the IDC indication message 1850 may include TDM pattern information. The TDM pattern may be a DRX cycle, a DRX active cycle, or a DRX subframe offset value.

Further, the IDC indication message 1850 may include the measurement results obtained through measurement considering IDC or measurement excluding IDC in accordance with the rules according to which the terminal acquires measurement samples.

FIG. 19 is a diagram explaining an example in which the terminal performs measurement considering IDC or measurement excluding IDC according to the present invention.

Referring to FIG. 19, in a cycle (first cycle) in which IDC occurs in a serving cell or a neighboring cell in which IDC occurs, the terminal obtains the measurement sample that is influenced by IDC, and in a cycle (second cycle) in which IDC does not occur, the terminal obtains a measurement sample that is not influenced by IDC. Here, the neighboring cell means a cell which is configured through an RRC connection reconfiguring process and is used as a comparison group of a measurement report event. Further, the terminal obtains the measurement samples in the whole cycle (third cycle) regardless of IDC in the serving cell or the neighboring cell, in which IDC does not occur. In this case, the terminal may obtain the measurement samples in respective cycles of each subframe, a fixed subframe, or a certain subframe.

As an example, the measurement sample that is influenced by IDC in the first cycle is a measurement sample considering all the influences of interference including IDC, interference between cells (for example, interference of co-channel serving and non-serving cells), adjacent channel interference, and thermal noise, and the measurement sample that is not influenced by IDC in the second cycle is a measurement sample that is influenced only by the interference between cells or thermal noise.

As still another example, in order to remove the influence of the interference, which occurs due to IDC in the whole cycle in the serving cell or the neighboring cell in which IDC occurs, from the measurement sample, a scheme for preventing the transmission of the ISM with respect to the corresponding measurement sample may be taken. The scheme for preventing the transmission of the ISM may be a scheme for greatly reducing the transmission power of the ISM. The great reduction of the transmission power of the ISM may be, for example, reduction of the IDC interference strength of the ISM against an LTE reception signal at an LTE reception end to about −20 dB. The scheme for preventing the transmission of the ISM may be a scheme for postponing the transmission of the ISM or not transmitting the USM with respect to the corresponding sample. That is, although the transmission of the ISM has been planned, the corresponding transmission may be postponed in time, or may be denied by the terminal. By this method, the measurement sample, from which the influence of the in-device coexistence interference is removed, can be obtained over the whole cycle illustrated in FIG. 19. Here, the measurement sample that is not influenced by IDC means the measurement sample that is influenced only by the interference between cells or thermal noise.

As still another example, two kinds of measurement samples may be obtained with respect to the first cycle in the serving cell or the neighboring cell in which IDC occurs. The two kinds of measurement samples may mean the measurement sample including the influence of the IDC interference and the measurement sample from which the influence of IDC interference is removed. The measurement sample from which the influence of IDC interference is removed means the measurement sample having a measurement value that is not influenced by the interference through application of the interference-removal technique to the corresponding sample. As one example of the interference-removal technique, there is a method for correcting the SINR value of the corresponding sample so that it is as high as the strength of the ISM transmission power at the ISM transmission end.

Here, a first network system means a network system that causes the interference when IDC occurs. A network system that is affected by the interference may be a second network system. For example, in the case where the ISM reception end is interfered by the LTE uplink, the ISM becomes the second network system. By contrast, in the case where the reception end of the LTE downlink is interfered with by the ISM transmission end, the LTE system becomes the second network system.

The measurement sample that is not influenced by IDC in the serving cell or the neighboring cell which is obtained on the basis of the RSRQ is conceptually as described in the following equation 1.

$$MeasurementSample = \frac{S}{I+N} \quad \text{Equation 1}$$

Here, S denotes the strength of a received signal through a neighboring cell in the second network system, I denotes the strength of an interference signal (for example, interference between cells) that acts on the second network system, and N denotes the strength of noise (for example, thermal noise). That is, the measurement sample means the ratio of the received signal relative to the interference and to the noise.

The measurement sample that is not influenced by IDC in the serving cell or the neighboring cell which is obtained on the basis of the RSRQ is conceptually as shown in the following equation 2.

$$MeasurementSample = S \quad \text{Equation 2}$$

Here, S denotes the strength of a received signal through a neighboring cell in the second network system. That is, the measurement sample means the strength of the received signal in the corresponding neighboring cell of the second network system.

The measurement sample that is influenced by IDC in the serving cell or the neighboring cell, which is obtained on the basis of the RSRQ, is conceptually as shown in the following equation 3.

$$MeasurementSample = \frac{S}{I+N+I'} \quad \text{Equation 3}$$

Here, S denotes the strength of a received signal through a serving cell in the second network system, I denotes the strength of an interference signal (for example, interference between cells) that acts on the second network system, N denotes the strength of noise (for example, thermal noise), and I' denotes the strength of IDC. That is, the measurement sample means the ratio of the received signal relative to IDC and to the interference between cells.

The measurement sample that is influenced by IDC in the serving cell or the neighboring cell which is obtained on the basis of the RSRQ is conceptually as shown in the following equation 4.

$$MeasurementSample = I',S+I',S \quad \text{Equation 4}$$

Here, I' denotes the strength of IDC, and the measurement sample means the strength of the IDC signal in the serving cell. S denotes the strength of the received signal in the second network system. If it is intended to measure only the influence of IDC, I' would become the resultant value. If an IDC-mixed value is measured, S+I' would become the resultant value. If the value from which IDC is removed is measured, S would be the resultant value.

On the other hand, an object (for example, terminal) that performs the measurement may be one object, and a plurality of objects may perform the measurement. For example, an object that performs the measurement considering IDC and an object that performs the measurement not considering IDC may independently exist.

Here, the measurement result means a value finally calculated through filtering of the measurement samples. For example, in the case of the LTE, the final values of RSRP (Reference Signal Received Power) and RSRQ (Reference Signal Received Quality), which are generated through L1 filtering and L3 filtering, are the measurement result that is reported to the base station. However, the measurement result considering the may be the result of filtering only the measurement samples including IDC or the result of filtering both the measurement samples including IDC and the measurement samples that do not include IDC. Further, the measurement result from which IDC is removed may be the result of filtering only the measurement samples that do not include IDC or the result of filtering the measurement samples from which IDC is removed by the interference-removal technique among the measurement samples including IDC in addition to the measurement samples that do not include IDC.

As an example, the measurement result included in the IDC indication message 1850 may be the measurement result from which IDC is removed. As another example, the measurement result included in the IDC indication message 1850 may be the measurement result considering IDC. As still another example, the measurement result included in the IDC indication message 1850 may include both the measurement result from which IDC is removed and the measurement result considering IDC. As still another example, the measurement result included in the IDC indication message 1850 may include both the strength of IDC and the measurement result from which IDC is removed. As still another example, the measurement result included in the IDC indication message 1850 may include both the strength of IDC and the measurement result considering IDC. As still another example, the measurement result included in the IDC indication message 1850 may include all of the strength of IDC, the activity of IDC, and the measurement result from which IDC is removed. Here, the activity of IDC means an index of how often IDC occurs over time. As an example, the activity of IDC may be defined as the ratio of the subframes in which IDC does not occur to the subframes in which IDC occurs. As a possible implementation example, there may be a scheme for obtaining an average value based on each subframe weight value. As still another example, the measurement result included in the IDC indication message 1850 may include all of the strength of IDC, the activity of IDC, and the measurement result considering the IDC.

As another example of the IDC indication operation in step S1800, the terminal may perform the IDC indication operation by transmitting a measurement report message 1855 to the base station. The measurement report message 1855 may be configured to perform the IDC indication only with respect to a specific frequency band. The measurement report message 1855 may include not only the measurement result but also unusable frequency information or TDM pattern information.

As an example, the measurement report message 1855 may include all EARFCN values of the unusable frequency band.

As another example, the measurement report message 1855 may include the EARFCN corresponding to the bound value of the unusable frequency band. The bound value may be the upper bound value or the lower bound value.

As still another example, the measurement report message 1855 may include the EARFCN that corresponds to the lower bound value, and based on this, the measurement report message may indicate that the frequency band that is larger than the lower bound value is an unusable frequency. Further, the measurement report message 1855 may include the EARFCN that corresponds to the upper bound value, and based on this, the measurement report message may indicate that the frequency band that is smaller than the upper bound value is an unusable frequency. In this case, whether the EARFCN included in the measurement report message 1855 is the upper bound value or the lower bound value may be predetermined through the 3GPP LTE standards. Further, an indicator indicating whether the EARFCN is the upper bound value or the lower bound value (a bound type indicator) may be further included in the measurement report message 1855. Further, the type of the bound value may be implicitly determined based on the number of the operating band to which the EARFCN included in the measurement report message 1855 belongs.

As still another example, the measurement report message 1855 may include the EARFCN and the EARFCN may be configured to indicate that the operating band region itself, in which the EARFCN is positioned, is an unusable frequency band. As still another example, if a plurality of operating bands is influenced by the frequency band indicated by the EARFCN, the measurement report message 1855 may be configured to indicate that all the plurality of operating bands are unusable frequency bands.

If an IDC entering indicator for indicating that the IDC-occurring state starts is not separately transmitted, and if the frequency band that is recognized as an usable frequency band by the base station through the measurement report message 1855 is indicated as an unusable frequency band, the base station may implicitly determine that the IDC-occurring state starts with respect to the corresponding frequency band.

On the other hand, the measurement report message 1855 may include TDM pattern information. The TDM pattern may be a DRX cycle, a DRX active cycle, or a DRX subframe offset value.

One or both of the unusable frequency information and the TDM pattern information may be included in the measurement report message 1855. If both the unusable frequency information and the TDM pattern information are provided, the unusable frequency information and the TDM pattern information are signaled in pairs.

Further, the measurement report message 1855 may include the measurement results obtained through the measurement in accordance with the rules according to which the terminal acquires measurement samples. In this case, the terminal may perform measurement considering IDC or measurement excluding IDC. As an example, the measurement result included in the measurement report message 1855 may be the measurement result from which IDC is removed. As another example, the measurement result included in the measurement report message 1855 may be the measurement result considering IDC. As still another example, the measurement result included in the measurement report message 1855 may include both the measurement result from which IDC is removed and the measurement result considering IDC. As still another example, the measurement result included in the measurement report message 1855 may include both the strength of IDC and the measurement result from which IDC is removed. As still another example, the measurement result included in the measurement report message 1855 may include both the strength of IDC and the measurement result considering IDC. As still another example, the measurement result included in the measurement report message 1855 may include all of the strength of IDC, the activity of IDC, and the measurement result from which IDC is removed. As still another example, the measurement result included in the measurement report message 1855 may include all of the strength of IDC, the activity of IDC, and the measurement result considering the IDC.

As still another example of the IDC indication operation in step S1800, the terminal may perform the IDC indication operation by transmitting a proximity indication message 1860, which is used for the proximity indication operation, to the base station. The proximity indication message 1860 may be configured to perform the IDC indication operation only with respect to a specific frequency band.

Further, an identifier, which discriminates the proximity indication message 1860 for the existing CSG (Closed Subscriber Group) and the proximity indication message 1860 including IDC indication information, may be further included in the proximity indication message 1860.

In the case in which the IDC indication information is included in the proximity indication message 1860, the proximity indication message 1860 may include the unusable frequency information or the TDM pattern.

As an example in which the proximity indication message 1860 includes the unusable frequency information, the proximity indication message 1860 may include all the EARFCN values of the unusable frequency band.

As another example, the proximity indication message 1860 may include the EARFCN corresponding to the boundary value of the unusable frequency band. The bound value may be the upper bound value or the lower bound value.

As still another example, the proximity indication message 1860 may include the EARFCN that corresponds to the lower bound value, and based on this, the proximity indication message may indicate that a frequency band that is larger than the lower bound value is an unusable frequency. Further, the proximity indication message 1860 may include the EARFCN that corresponds to the upper bound value, and based on this, the proximity indication message may indicate that a frequency band that is smaller than the upper bound value is an unusable frequency. In this case, whether the EARFCN included in the proximity indication message 1860 is the upper bound value or the lower bound value may be predetermined through the 3GPP LTE standards. Further, an indicator indicating whether the EARFCN is the upper bound value or the lower bound value (a bound type indicator) may be further included in the proximity indication message 1860. Further, the type of the bound value may be implicitly determined based on the number of the operating band to which the EARCN included in the proximity indication message 1860 belongs.

As still another example, the proximity indication message 1860 may include the EARFCN, and the EARFCN may indicate that the operating band region itself, in which the EARFCN is positioned, is an unusable frequency band.

As still another example, if a plurality of operating bands is influenced by the frequency band indicated by the EARFCN, the proximity indication message 1860 may be configured to indicate that all the plurality of operating bands are unusable frequency bands.

If an IDC entering indicator for indicating that the IDC-occurring state starts is not separately transmitted, and if a frequency band that is recognized as an usable frequency band by the base station through the proximity indication message 1860 is indicated as an unusable frequency band, the base station may determine that the IDC-occurring state starts with respect to the corresponding frequency band.

On the other hand, the proximity indication message 1860 may include TDM pattern information. The TDM pattern may be a DRX cycle, a DRX active cycle, or a DRX subframe offset value.

One or both of the unusable frequency information and the TDM pattern information may be included in the proximity indication message 1860. If both the unusable frequency information and the TDM pattern information are provided, the unusable frequency information and the TDM pattern information are signaled in pairs.

To follow the step S1800, the base station selects the most suitable IDC resolution (or coordination scheme) based on the IDC indication information received from the terminal (S1805). In this case, the IDC resolution may be an FDM operation or a TDM operation. The FDM operation or the TDM operation may be an operation as depicted in FIGS. 5 to 13. As an example, if it is determined that there is no problem in the usable frequency band through the load balance and handover is not greatly influenced (for example, if the RSRP or RSRQ value of the corresponding frequency band is sufficiently large) when a problem occurs in the frequency band through which the base station provides service, the FDM operation may be performed, and otherwise, the TDM operation may be performed in the serving cell.

The TDM operation based on the DRX in the case where the IDC resolution is the TDM operation according to the present invention will be described.

The base station transmits an IDC resolution order to the terminal based on the IDC resolution method (S1810). For example, the IDC resolution order may be transmitted through an RRC connection reconfiguration message.

As an example, the IDC resolution order may include an operation of a prohibition timer, which prohibits transmission of the IDC indication message 1850, the measurement report message 1855, or the proximity indication message 1860 for a predetermined time.

As still another example, if the determined IDC resolution order is the TDM operation, a specific DRX pattern may be transmitted through the RRC connection reconfiguration message.

As still another example, if the determined IDC resolution order is the TDM operation, an indicator, which indicates that the DRX pattern is caused by the IDC, may be transmitted together with the specific DRX pattern through the RRC connection reconfiguration message, and this is called a TDM IDC indicator. Hereinafter, this will be described in detail. The measurement that is performed by the terminal in accordance with the indication of the TDM IDC indicator may be changed so that it is different from the previous one.

As still another example, if the determined IDC resolution operation is the TDM operation, HARQ retransmission in the LTE band may be denied for handling of a beacon while the signal is transmitted in the ISM band. That is, the start of the IDC resolution order may be instructed through the IDC indication message (or the measurement report message or the proximity indication message).

On the other hand, if the IDC resolution operation that is determined by the base station on the basis of the IDC indication information is the same as the IDC resolution operation that exists and is in progress, the IDC resolution ordering process may be omitted.

Figure 20B:
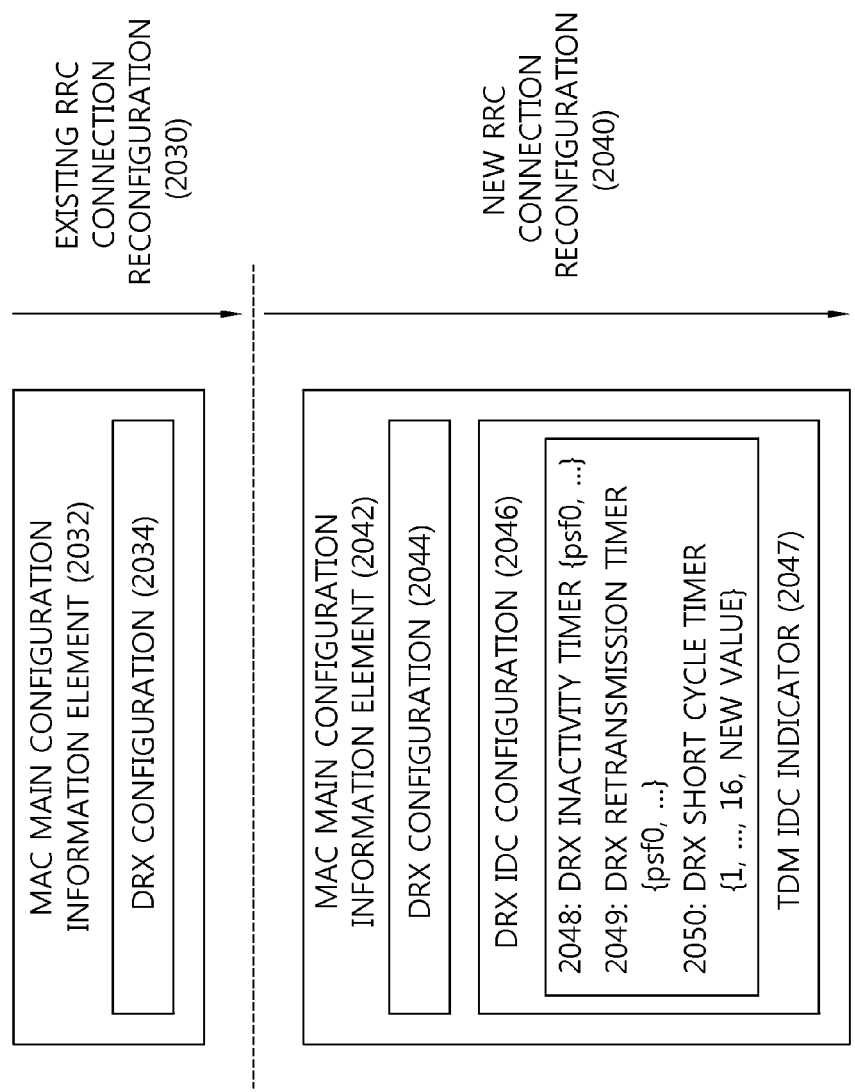
Figure 20C:
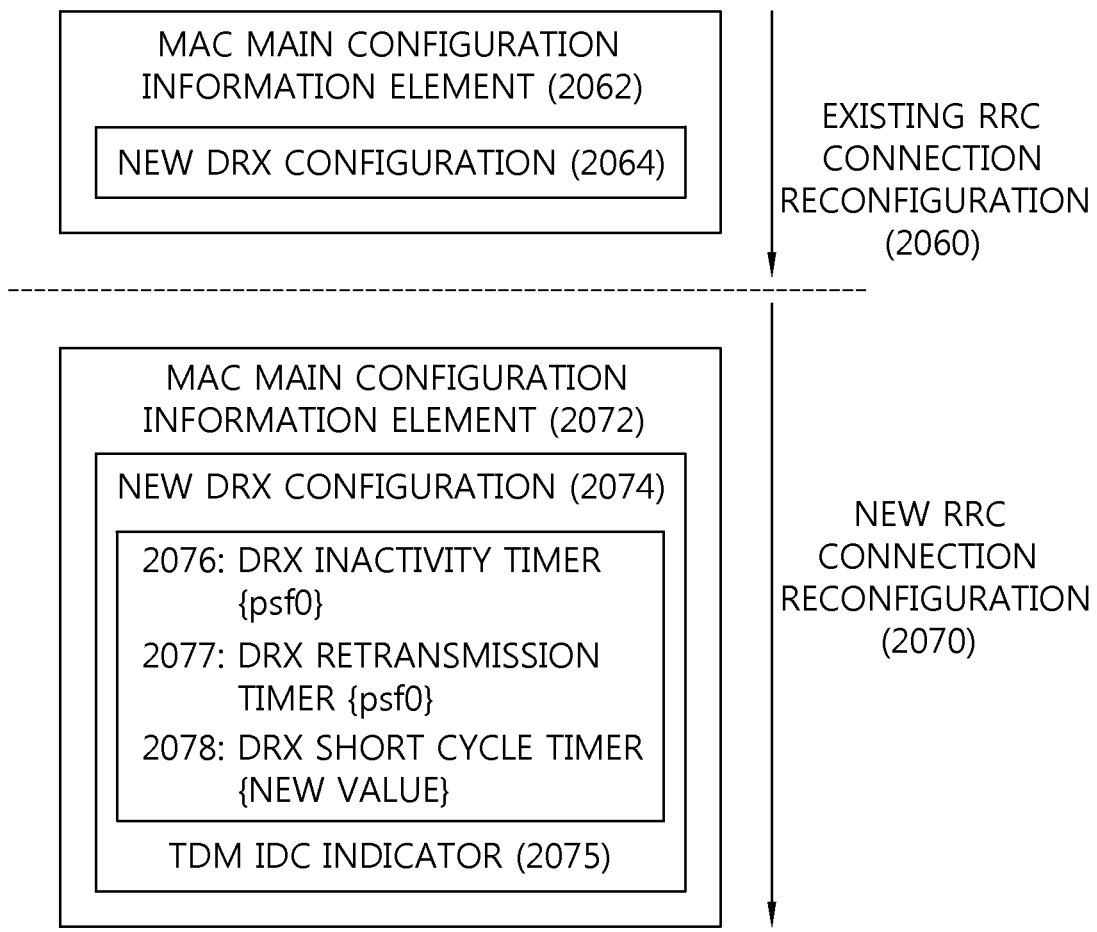

FIGS. 20A to 20C are diagrams illustrating an example of an IDC resolution order indicating that the TDM operation is caused by IDC according to the present invention.

FIGS. 20A to 20C are related to a method for directly signaling an explicit value of the DRX pattern through the base station. In addition, there is a method (not illustrated in the drawing) for transmitting only the TDM IDC indicator and configuring an implicit value in accordance with the internal configuration of the terminal and the base station.

Referring to FIG. 20A, through the existing RRC connection reconfiguration 2000, the base station transmits a MAC main configuration information element 2002, which includes a DRX configuration 2004.

According to the present invention, through new RRC connection reconfiguration 2010 according to the IDC resolution order (S1810), the base station may transmit a MAC main configuration information element 2012, in which a DRX IDC configuration 2014 and a TDM IDC indicator 2015 are included.

The DRX IDC configuration information 2014 may include configuration information about a DRX inactivity timer 2016, a DRX retransmission timer 2017, and a DRX short cycle timer 2018. In this case, the DRX inactivity timer 2016 may be configured as psf0, the DRX retransmission timer 2017 may be configured as psf0, and the DRX short cycle timer 2018 may be configured as a value in the range from 1 to 16, or a new value that is larger. The new value may be configured as a very large value, such as 2560, or an infinite value, and thus the DRX short cycle timer may be configured to be stopped only through the RRC connection reconfiguration or release.

If the DRX inactivity timer is configured as psf0, the DRX inactivity timer starts through reception of the PDCCH, which indicates the new transmission, and then immediately expires. Accordingly, the DRX inactivity timer does not exert an influence on the active time. If the on-duration timer has expired, the active time is not maintained by the influence of the DRX inactivity timer even if a PDCCH that indicates the new transmission is received.

If the DRX retransmission timer is configured as psf0, the DRX retransmission timer does not exert an influence on the active time due to failure of data decoding in the HARQ procedure. If the on-duration timer has expired, the active time is not maintained by the value of the DRX retransmission timer even if data decoding fails in the HARQ procedure.

The terminal reconfigures the values received through the DRX IDC configuration 2014 and the TDM IDC indicator 2015 as the value set by the existing DRX configuration 2004.

Further, CQI masking is set up, and the non-scheduled cycle (for example, the ISM transmission cycle in the TDM operation) may be protected. For example, a parameter "Cqi-Mask" of a CQI report configuration information element (CQI-ReportConfig information element) may be configured as "setup".

The following Table 3 shows an example of the MAC main configuration information elements according to the present invention.

TABLE 3

```
-- ASN1START
MAC-MainConfig ::=SEQUENCE {
    drx-Config DRX-Config OPTIONAL,   -- Need ON
    [[mac-MainConfig-v11xx  SEQUENCE {
        idcTdm  ENUMERATED {setup}
    OPTIONAL, -- Need OR
        drx-Config-Idc  DRX-Config-Idc  OPTIONAL, --
Cond idcTdm
    }  OPTIONAL   -- Need ON
    ]]
    ...
}
DRX-Config-Idc ::=  CHOICE {
    release  NULL,
    setup  SEQUENCE {
        drx-InactivityTimer  ENUMERATED {psf0},
        drx-RetransmissionTimer  ENUMERATED {psf0},
        shortDRX  SEQUENCE {
            shortDRX-Cycle  ENUMERATED  {
                sf2, sf5, sf8, sf10, sf16,
sf20, sf32, sf40, sf64, sf80, sf128, sf160, sf256, sf320, sf512, sf640},
            drxShortCycleTimer  INTEGER (1..2560)
        }  OPTIONAL   -- Need OR
    }
}
-- ASN1STOP
```

Here, the MAC main configuration control element is MAC_MainConfig, the DRX configuration is drx-Config, the MAC main configuration control element according to new RRC connection reconfiguration is mac-MainConfig-vllxx, the TDM IDC indicator is idcTdm, the DRX IDC configuration is drx-Config-Idc, the DRX inactivity timer is drx-InactivityTimer, the DRX retransmission timer is drx-RetransmissionTimer, and the DRX short cycle timer is drxShortCycleTimer. Further, a new value is configured as 2560.

Referring to FIG. 20B, through the existing RRC connection reconfiguration 2030, the base station transmits a MAC main configuration information element 2032, in which a DRX configuration 2034 is included.

According to the present invention, through new RRC connection reconfiguration 2040 according to the IDC resolution order (S1810), the base station may transmit a MAC main configuration information element 2012, in which not only the existing DRX configuration 2044 but also a DRX IDC configuration 2046 and a TDM IDC indicator 2047 are included.

The DRX IDC configuration information 2046 may include configuration information about a DRX inactivity timer 2048, a DRX retransmission timer 2049, and a DRX short cycle timer 2050. In this case, the DRX inactivity timer 2048 may be configured as psf0, the DRX retransmission timer 2049 may be configured as psf0, and the DRX short cycle timer 2050 may be configured as a value in the range from 1 to 16 or a new value that is larger. The new value may be configured as a very large value, such as 2560, or an infinite value, and thus the DRX short cycle timer may be configured to be stopped only through the RRC connection reconfiguration or release.

The terminal reconfigures the values configured by the existing DRX configuration 2034 with respect to changed values among values received through the DRX configuration 2044, which is not related to IDC, and values received through the DRX IDC configuration 2046 and the TDM IDC indicator 2047. That is, with respect to the DRX inactivity timer 2048, the DRX retransmission timer 2049, and the DRX short cycle timer 2050, a new value for IDC is signaled in addition to the existing DRX configuration value, and IDC-related values can be selected by the terminal.

Further, CQI masking is set up, and the non-scheduled cycle (for example, the ISM transmission cycle in the TDM operation) may be protected. For example, a parameter "Cqi-Mask" of a CQI report configuration information element may be configured as "setup".

The following Table 4 shows another example of the MAC main configuration information elements according to the present invention.

TABLE 4

```
-- ASN1START
MAC-MainConfig ::=  SEQUENCE {
    drx-Config  DRX-Config  OPTIONAL,   -- Need ON
    [[mac-MainConfig-v11xx  SEQUENCE {
        drx-Config  DRX-Config  OPTIONAL,   -- Need ON
        idcTdm  ENUMERATED {setup}
    OPTIONAL,  -- Need OR
        drx-Config-Idc  DRX-Config-Idc  OPTIONAL,--
Cond idcTdm
    }  OPTIONAL   -- Need ON
    ]]
    ...
}
DRX-Config-Idc ::=  CHOICE {
    release  NULL,
    setup  SEQUENCE {
        drx-InactivityTimer  ENUMERATED {psf0},
        drx-RetransmissionTimer  ENUMERATED {psf0},
        shortDRX  SEQUENCE {
            shortDRX-Cycle  ENUMERATED  {
                sf2, sf5, sf8, sf10, sf16,
sf20, sf32, sf40, sf64, sf80, sf128, sf160, sf256, sf320, sf512, sf640},
            drxShortCycleTimer  INTEGER (1..2560)
        }  OPTIONAL   -- Need OR
    }
}
-- ASN1STOP
```

Here, the MAC main configuration control element is MAC_MainConfig, the DRX configuration is drx-Config, the MAC main configuration control element according to new RRC connection reconfiguration is mac-MainConfig-vllxx, the TDM IDC indicator is idcTdm, the DRX IDC configuration is drx-Config-Idc, the DRX inactivity timer is drx-InactivityTimer, the DRX retransmission timer is drx-RetransmissionTimer, and the DRX short cycle timer is drxShortCycleTimer.

Referring to FIG. 20C, a MAC main configuration information element 2062, which the base station transmits through the existing RRC connection reconfiguration 2060, includes new DRX configuration 2064, which includes the DRX IDC configuration according to the present invention. That is, the new DRX configuration 2064 includes configuration of the DRX inactivity timer, the DRX retransmission timer, and the DRX short cycle timer, and the MAC main configuration information element 2062 including the new DRX configuration 2064 is a new information element according to the present invention.

According to the present invention, through new RRC connection reconfiguration 2070 according to the IDC resolution order (S1810), the base station may transmit a MAC main configuration information element 2072, in which a new DRX configuration 2074 and a TDM IDC indicator 2075 are included.

In accordance with the new DRX configuration information 2074, the DRX inactivity timer 2076 may be configured as psf0, the DRX retransmission timer 2077 may be configured as psf0, and the DRX short cycle timer 2078 may be configured as a new value. The new value may be configured as a very large value, such as 2560, or an infinite value, and thus the DRX short cycle timer may be configured to be stopped only through the RRC connection reconfiguration or release.

The terminal reconfigures the values configured by the existing DRX configuration 2064 as the values received through the new DRX configuration 2074 and the TDM IDC indicator 2075.

Further, CQI masking is set up, and the non-scheduled cycle (for example, the ISM transmission cycle in the TDM operation) may be protected. For example, a parameter "Cqi-Mask" of a CQI report configuration information element may be configured as "setup".

The following Table 5 shows another example of the MAC main configuration information elements according to the present invention.

TABLE 5

```
-- ASN1START
MAC-MainConfig ::= SEQUENCE {
   drx-Config-version11.xxx   DRX-Config-version11.xxx
OPTIONAL,   -- Need ON
      idcTdm   ENUMERATED {setup}
OPTIONAL,   -- Need OR
      ...
}
DRX-Config-version11.xxx ::=   CHOICE {
   release   NULL,
   setup   SEQUENCE {
      onDurationTimer   ENUMERATED {
         psf1, psf2, psf3, psf4, psf5, psf6,
psf8, psf10, psf20, psf30, psf40, psf50, psf60, psf80, psf100, psf200},
      drx-InactivityTimer   ENUMERATED {
         psf1, psf2, psf3, psf4, psf5, psf6,
psf8, psf10, psf20, psf30, psf40, psf50, psf60, psf80, psf100, psf200, psf300, psf500,
psf750, psf1280, psf1920, psf2560, psf0-v1020, spare9, spare8, spare7, spare6, spare5,
spare4, spare3, spare2, spare1},
      drx-RetransmissionTimer   ENUMERATED {
         psf1, psf2, psf4, psf6, psf8, psf16,
psf24, psf33,psf0-v11xx},
      longDRX-CycleStartOffset   CHOICE {
         sf10      INTEGER(0..9),
         sf20      INTEGER(0..19),
         sf32      INTEGER(0..31),
         sf40      INTEGER(0..39),
         sf64      INTEGER(0..63),
         sf80      INTEGER(0..79),
         sf128     INTEGER(0..127),
         sf160     INTEGER(0..159),
         sf256     INTEGER(0..255),
         sf320     INTEGER(0..319),
         sf512     INTEGER(0..511),
         sf640     INTEGER(0..639),
         sf1024    INTEGER(0..1023),
         sf1280    INTEGER(0..1279),
         sf2048    INTEGER(0..2047),
         sf2560    INTEGER(0..2559)
      },
      shortDRX   SEQUENCE {
         shortDRX-Cycle   ENUMERATED   {
            sf2, sf5, sf8, sf10, sf16,
sf20, sf32, sf40, sf64, sf80, sf128, sf160, sf256, sf320, sf512, sf640},
         drxShortCycleTimer   INTEGER (1..16)
         drxShortCycleTimerIdc   infinite (or Newvalue) --
Need OR
         }
         OPTIONAL   -- Need OR
      }
   }
```

Here, the MAC main configuration control element is MAC_MainConfig, the DRX configuration is drx-Config, the new DRX configuration is drx-Config-version11.xxx, the MAC main configuration control element according to the new RRC connection reconfiguration is mac-MainConfigv-11xx, the TDM IDC indicator is idcTdm, the on-duration timer is on-DurationTimer, the DRX inactivity timer is drx--InactivityTimer, the DRX retransmission timer is drx-RetransmissionTimer, the short DRX cycle is shortDRX-Cycle, and the DRX short cycle timer is drxShortCycleTimer. Further, the DRX short cycle timer for IDC is drxShortCycleTimerIdc, and the value thereof may be an infinite value or a new value.

Now, a method (not illustrated in the drawing) for transmitting only the TDM IDC indicator and configuring an implicit value in accordance with the internal configuration of the terminal and the base station will be described.

In this case, the MAC main configuration information element that the base station transmits to the terminal includes a TDM IDC indicator. If the TDM IDC indicator is received, the terminal itself may configure the DRX inactivity timer as psf0, configure the DRX retransmission timer as psf0, and configure the DRX short cycle timer as a new value. The new value may be configured as a very large value, such as 2560, or an infinite value, and thus the DRX short cycle timer may be configured to be stopped only through the RRC connection reconfiguration or release.

The values (psf0 and 2560) presented in the signaling technique are examples, and other values may be configured on the basis of the TDM IDC indicator. However, the base station does not transmit accurate values, but the system configures the values in advance. Accordingly, the values are already known in the terminal and the base station through separate signaling. Through the reception of the TDM IDC indicator, the known values are configured by the terminal.

Further, the CQI masking is set up by the TDM IDC indicator, and the non-scheduled cycle (for example, the ISM transmission cycle in the TDM operation) may be protected. For example, a parameter "Cqi-Mask" of a CQI report configuration information element (CQI-ReportConfig information element) may be configured as "setup".

To follow the step S1810, the terminal performs the IDC resolution operation (S1815), and performs the TDM operation as the IDC resolution operation based on the IDC resolution order (S1810). As an example of the TDM operation, a scheduling request operation or the random access operation may be performed. The operation of the DRX timer and CQI, PMI, PTI, or RI follow the values configured according to the MAC main configuration information elements 2010, 2040, and 2070 transmitted in the step S1810.

As an example, in transmitting the scheduling request in the non-scheduled cycle as the scheduling request operation, an autonomous denial operation, as illustrated in FIG. 12 or 13, may be performed in accordance with the determination of the terminal. In the terminal, LTE QoS (Quality of Service) and ISM QoS are compared with each other, and the autonomous denial operation may be configured to be performed as long as the LTE QoS does not decrease below a predetermined value.

As another example, in the scheduling request operation, even if a scheduling request is pending, the non-scheduled cycle may start. That is, in the case where the non-scheduled cycle starts in accordance with the operation of other timers even if a scheduling request is pending, the scheduled cycle, that is, the DRX active time, is not maintained in the DRX operation used for IDC. Accordingly, if a scheduling request is pending in the DRX operation, which is not for the purpose of IDC, the operation is performed in the active time when the reception of the PDCCH is possible for the corresponding time regardless of the operation of other timers. However, in the DRX operation that is for the purpose of IDC, the operation is performed in the non-active time, during which the reception of the PDCCH is not performed, even if the scheduling request is pending.

As still another example, in changing the scheduling request operation, the operation of a scheduling request pending counter SR_COUNTER may be changed. Here, the scheduling request pending counter monitors the pending state of a scheduling request every transmit time interval (TTI), and if a scheduling request is pending, the scheduling request pending counter increments by 1. If the count value of the scheduling request pending counter exceeds a predetermined counter upper limit value (dsr-TransMax), the random access operation starts for the purpose of the scheduling request. However, since in the DRX operation used for the purpose of IDC, the DRX active time may not start even if a scheduling request is pending, the counter increment operation in the DRX non-active time, that is, in the non-scheduled cycle, may be reserved with respect to the corresponding counter. That is, during the DRX non-active time, the counter operation is reserved even if a scheduling request is pending, and the counter may not increment at each transmit time interval. When the DRX active time is resumed, the corresponding counter increments again.

As still another example, in the scheduling request operation, the scheduling request may be permitted even during the DRX non-active time. That is, although the base station is unable to grant the terminal uplink resources for the scheduling request during the corresponding non-active time, the terminal can make the corresponding request with respect to the base station for the purpose of indicating the necessity of the uplink transmission. The base station may grant the uplink transmission resources through the next active time in response to the corresponding request, or may change the pattern of the DRX for the purpose of IDC. As an example, in order to lengthen the scheduled cycle for LTE transmission of the corresponding terminal, a longer DRX on-duration timer may be configured.

In the random access operation, in the terminal that has performed the preamble transmission, the LTE QoS and the ISM QoS are compared with each other, and the autonomous denial operation may be performed as long as the LTE QoS does not decrease too much.

Figure 21:
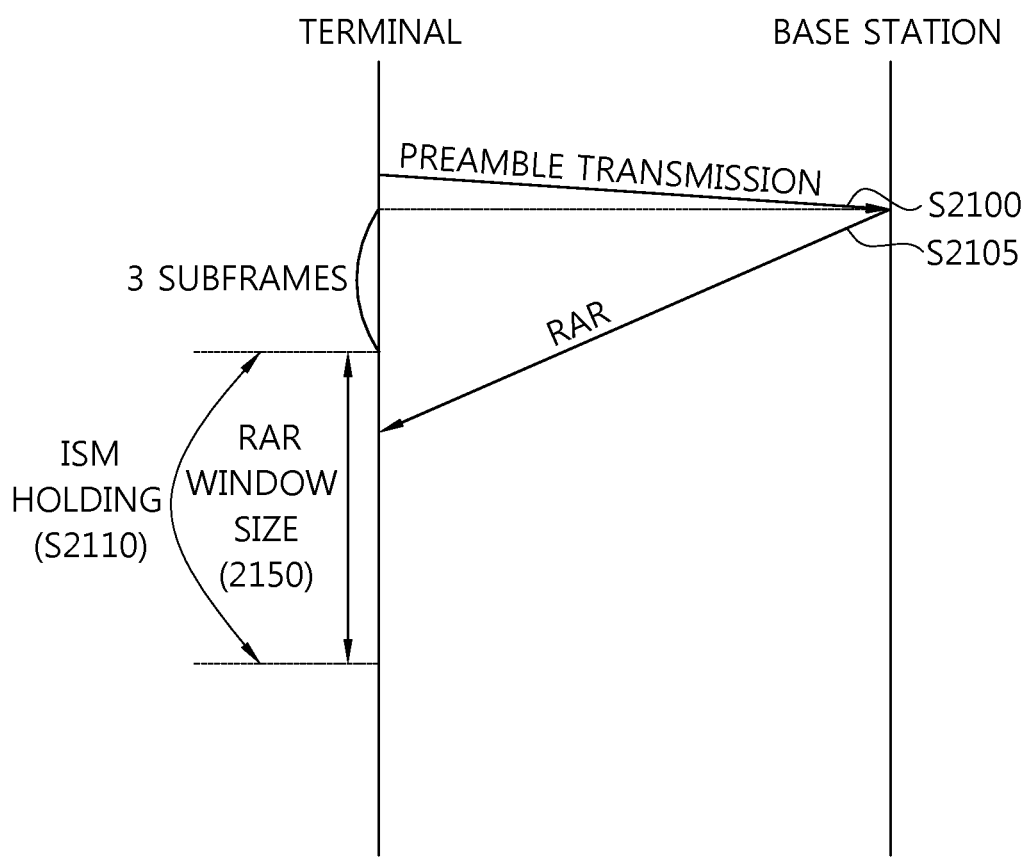
FIG. 21 illustrates an example of random access through which the autonomous denial operation according to the present invention is performed.

FIG. 21 illustrates an example of random access through which the autonomous denial operation according to the present invention is performed.

Referring to FIG. 21, after the terminal transmits a preamble to the base station (S2100), the base station transmits a RAR to the terminal in response thereto (S2105).

In this case, if a RAR window region, which is determined by the RAR window size (ra-ResponseWindowSize) 2150, exists outside the on-duration timer operation region, ISM transmission may be autonomously denied and temporarily postponed during the whole of the corresponding RAR window region (S2110).

Figure 22:
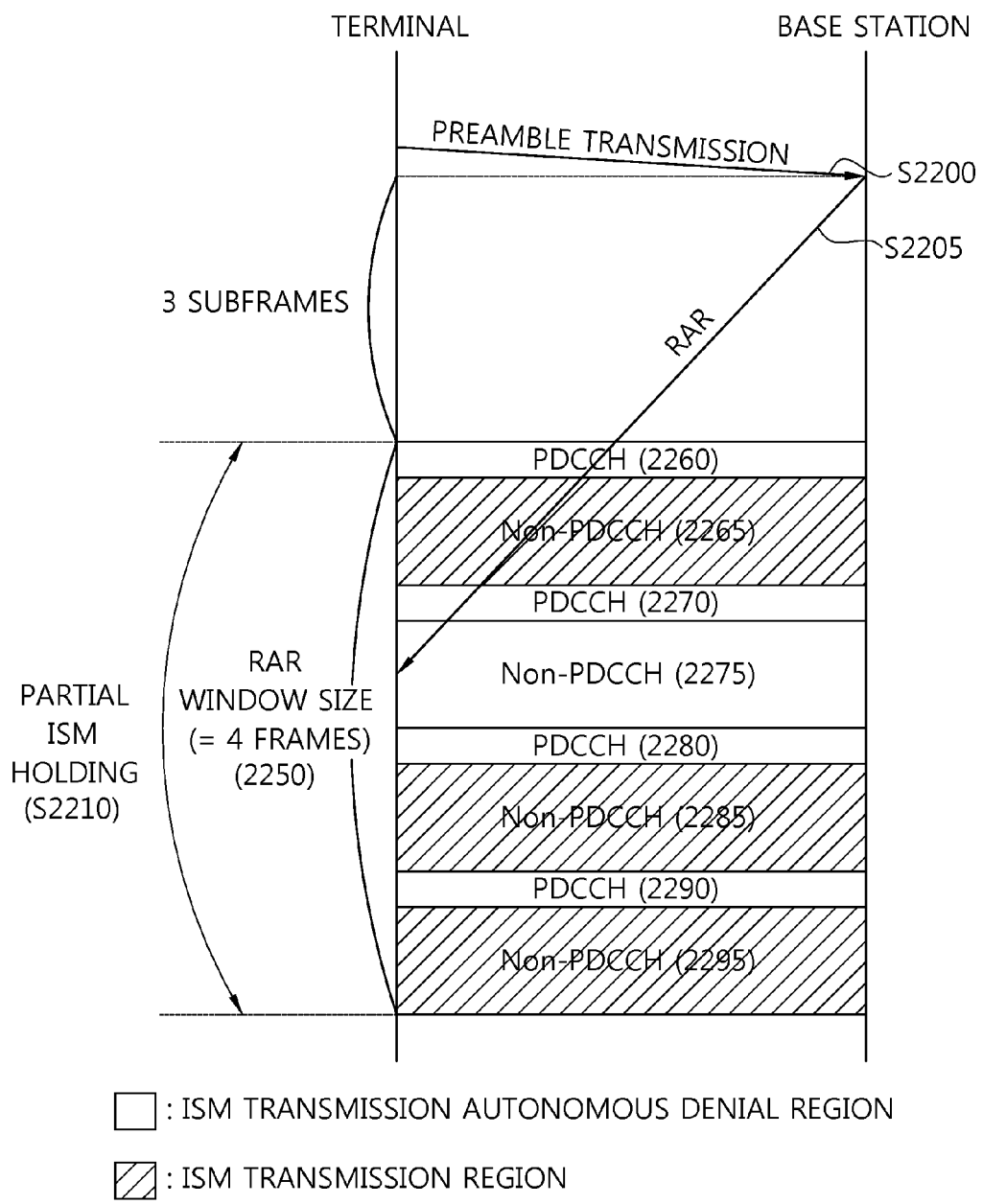
FIG. 22 illustrates another example of random access through which the autonomous denial operation according to the present invention is performed.

FIG. 22 illustrates another example of random access through which the autonomous denial operation according to the present invention is performed.

Referring to FIG. 22, after the terminal transmits a preamble to the base station (S2200), the base station transmits a RAR to the terminal in response thereto (S2205).

In this case, if a RAR window size (ra-ResponseWindowSize) 2250 is four subframes and a RAR window region, which is determined by the RAR window size, exists outside the on-duration timer operation region, partial ISM transmission may be autonomously denied with respect to the RAR window region, and the partial ISM transmission may be postponed (S2210).

In principle, the autonomous denial of the ISM transmission is performed with respect to PDCCH regions 2260, 2270, 2280, and 2290, and the LTE reception of the terminal is protected.

It is determined whether to deny the ISM transmission with respect to non-PDCCH regions 2265, 2285, and 2295 based on the PDCCH regions 2260, 2270, 2280, and 2290.

If downlink resource allocation does not exist in the non-PDCCH regions 2265, 2275, 2285, and 2295, which are indicated by PDCCHs 2260, 2280, and 2290 of the subframes, it is not necessary to deny the ISM transmission, and thus the ISM transmission is permitted.

If downlink resource allocation exists in the non-PDCCH region 2275, which is indicated by the PDCCH 2270 of the subframes, IDC may occur through the ISM transmission, and thus the ISM transmission is denied.

If the PDCCH is a PDCCH that is not scrambled by a RA-RNTI (Random Access-Radio Network Temporary Identifier) that indicates the existence of a RAR MAC CE (RAR MAC Control Element), it would not be necessary to perform ISM autonomous denial with respect not only to the corresponding PDCCH but also to the non-PDCCH region indicated by the PDCCH.

However, with respect to the subframe region, which is called by the PDCCH region that is scrambled by the RA-RNTI indicating the existence of the RAR MAC CE, the ISM autonomous denial may be performed for the RAR reception. That is, if the PDCCH 2270 is scrambled by the RA-RNTI, ISM autonomous denial may be performed with respect to the region of the PDCCH 2275 of the subframe region that is called by the corresponding PDCCH 2270.

Figure 23:
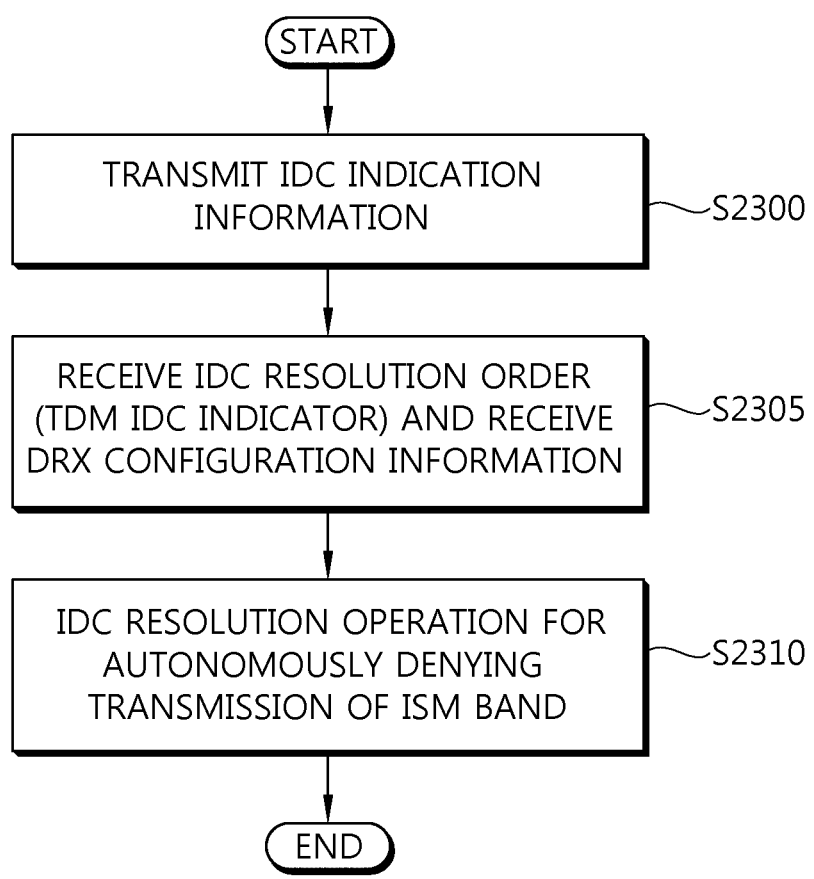
FIG. 23 is a flowchart illustrating the operation of a terminal that controls the in-device coexistence interference according to the present invention.

FIG. 23 is a flowchart illustrating the operation of a terminal that controls the in-device coexistence interference according to the present invention.

Referring to FIG. 23, the terminal performs the IDC indication operation through transmission of the IDC indication information to the base station (S2300). The IDC indication information (or IDC support information) may be indication information that is discriminated with respect to the TDM operation or the FDM operation, or indication information that is integrated with the TDM operation or the FDM operation. In this case, the indication information discriminated with respect to the TDM operation or the FDM operation may have priority which the terminal can request between the TDM operation and the FDM operation, which are IDC resolutions on the terminal side.

Further, the measurement result may be included in the IDC indication information. The measurement result may be used to determine which IDC resolution is more suitable. For example, if the target cell for the FDM operation has poor channel quality, the base station may select the TDM solution to solve the IDC problem of the serving cell.

The terminal may perform the IDC indication operation by transmitting an IDC indication message, a measurement report message, or a proximity indication message, which is a new message format, to the base station. The IDC indication message (measurement report message or proximity indication message) may include unusable frequency band information. As an example, the IDC indication message (measurement report message or proximity indication message) may include an EARFCN value of the unusable frequency band.

On the other hand, the IDC indication message (measurement report message or proximity indication message) may include TDM pattern information. The TDM pattern may be a DRX cycle, a DRX active cycle, or a DRX subframe offset value.

Further, the IDC indication message (measurement report message or proximity indication message) may include the result of measurement considering IDC or the result of measurement excluding IDC in accordance with the rules according to which the terminal acquires the measurement samples. The measurement results included in the IDC indication message (measurement report message or proximity indication message) may include at least one of the IDC strength, the IDC activity, the measurement result considering IDC, and the measurement result excluding IDC.

The terminal receives the most suitable IDC resolution order, selected based on the IDC indication information, from the base station (S2305). For example, the IDC resolution order may be transmitted through the RRC connection reconfiguration message.

As an example, if the determined IDC resolution order is the TDM operation, the terminal may receive the TDM IDC indicator, indicating that the DRX pattern is caused by IDC together with a specific DRX pattern, through the RRC connection reconfiguration message.

As another example, if the determined IDC resolution order is the TDM operation, the terminal may receive the DRX configuration information, such as a specific DRX pattern, through the RRC connection reconfiguration message.

As still another example, if the determined IDC resolution order is the TDM operation, the terminal may deny the HARQ retransmission in the LTE band for the handling of a beacon while the signal is transmitted in the ISM band. That is, the start of the IDC resolution order may be instructed through the IDC indication message (or measurement report message or proximity indication message).

As still another example, the IDC resolution order may include the operation of a prohibition timer that prohibits transmission of the IDC indication message (measurement report message or proximity indication message) for a predetermined time.

On the other hand, if the IDC resolution operation that the base station determines based on the IDC indication information is the same as the IDC resolution operation that is currently in progress, the IDC resolution order procedure may be omitted.

On the other hand, the terminal may directly receive DRX configuration information including an accurate value for the DRX pattern from the base station. Further, although the terminal receives only the TDM IDC indicator, an autonomous DRX pattern value may be configured depending on the configuration in the terminal.

As an example (embodiment 1), the terminal may receive a MAC main configuration information element in which the DRX IDC configuration and the TDM IDC indicator are included. The DRX IDC configuration may include configuration information on the DRX inactivity timer, the DRX retransmission timer, and the DRX short cycle timer. As shown in Table 3 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release.

If the DRX inactivity timer is configured as psf0, the DRX inactivity timer starts through the reception of the PDCCH that indicates the new transmission and then immediately expires. Accordingly, the DRX inactivity timer does not have any influence on the active time. If the on-duration timer has expired, the active time is not maintained by the influence of the DRX inactivity timer even if a PDCCH that indicates a new transmission is received.

If the DRX retransmission timer is configured as psf0, the DRX retransmission timer does not exert an influence on the active time due to failure of data decoding in the HARQ procedure. If the on-duration timer has expired, the active time is not maintained by the value of the DRX retransmission timer even if data decoding fails in the HARQ procedure.

In this case, the values that the terminal receives through the DRX IDC configuration and the TDM IDC indicator are values for reconfiguring the existing DRX configuration values.

As another example (embodiment 2), the terminal may receive the MAC main configuration information element in which not only the existing DRX configuration but also the DRX IDC configuration and the TDM IDC indicator are included. The DRX IDC configuration information may include configuration information on the DRX inactivity timer, the DRX retransmission timer, and the DRX short cycle timer. As shown in Table 4 above, the DRX inactivity timer may be configured as psf0, the DRX retransmission timer may be configured as psf0, and the DRX short cycle timer may be configured as a value in the range from 1 to 16, or a new value that is larger. The new value may be configured as a very large value, such as 2560, or an infinite value, and thus the DRX short cycle timer may be configured to be stopped only through the RRC connection reconfiguration or release.

In this case, the terminal may reconfigure the existing DRX configuration values with respect to changed values among values received through the DRX configuration that is not related to IDC and values received through the DRX IDC configuration and the TDM IDC indicator. That is, with respect to the DRX inactivity timer, the DRX retransmission timer, and the DRX short cycle timer, a new value for IDC is signaled in addition to the existing DRX configuration value, and IDC-related values can be selected by the terminal.

As still another example (embodiment 3), the MAC main configuration information element that the terminal receives includes values related to the DRX IDC configuration (this is called new DRX configuration). That is, the new DRX configuration includes new configuration values that are different from the existing values with respect to the DRX inactivity timer, the DRX retransmission timer, and the DRX short period timer, and the MAC main configuration information element including the new DRX configuration is a new information element that is different from the existing information element according to the present invention.

According to the present invention, the terminal may receive the MAC main configuration information element in which the new DRX configuration and the TDM IDC indicator are included.

In accordance with the new DRX configuration information, the DRX inactivity timer may be configured as psf0, the DRX retransmission timer may be configured as psf0, and the DRX short cycle timer may be configured as a new value. The new value may be configured as a very large value, such as 2560, or an infinite value, and thus the DRX short cycle timer may be configured to be stopped only through the RRC connection reconfiguration or release.

In this case, the terminal reconfigures the configuration values that are caused by the existing new DRX configuration through the values received through the new DRX configuration and the TDM IDC indicator.

As still another example (embodiment 4), the terminal receives only the TDM IDC indicator, but configures the DRX in accordance with the pre-engagement in the terminal. The TDM IDC indicator may be included in the MAC main configuration information element that the terminal receives from the base station.

In this case, if the TDM IDC indicator is received, the terminal itself may configure the DRX inactivity timer as psf0, configure the DRX retransmission timer as psf0, and configure the DRX short cycle timer as a new value. The new value may be configured as a very large value, such as 2560, or an infinite value, and thus the DRX short cycle timer may be configured to be stopped only through the RRC connection reconfiguration or release.

On the other hand, the values (psf0 and 2560) presented in the signaling technique are examples, and other values may be configured on the basis of the TDM IDC indicator. However, the base station does not transmit accurate values, but the system determines the values in advance. Accordingly, the values are already known in the terminal and the base station through separate signaling. Through the reception of the TDM IDC indicator, the known values are configured by the terminal.

In the above-described embodiment 1 to embodiment 4, the CQI masking is set up by the TDM IDC indicator, and the non-scheduled cycle (for example, the ISM transmission cycle in the TDM operation) may be protected. For example, a parameter "Cqi-Mask" of a CQI report configuration information element may be configured as "setup".

To follow the step S2305, the terminal performs the IDC resolution operation, and performs the TDM operation as the IDC resolution operation based on the IDC resolution order (S2310). As an example of the TDM operation, an operation, which autonomously denies the ISM band transmission, of the scheduling request operation and the random access operation may be performed. The operation of the DRX timer and CQI, PMI, PTI, or RI follow the values configured according to the MAC main configuration information elements previously received.

As an example, in the scheduling request operation, in transmitting the scheduling request in the non-scheduled cycle, an autonomous denial operation, as illustrated in FIG. 12 or 13, may be performed in accordance with the determination of the terminal. In the terminal, LTE QoS (Quality of Service) and ISM QoS are compared with each other, and the autonomous denial operation may be configured to be performed as long as the LTE QoS does not decrease below a predetermined value.

As another example, in the scheduling request operation, even if a scheduling request is pending, the non-scheduled cycle may start. That is, in the case where the non-scheduled cycle starts in accordance with the operation of other timers even if a scheduling request is pending, the scheduled cycle, that is, the DRX active time, is not maintained in the DRX operation used for IDC. Accordingly, if a scheduling request is pending in a DRX operation that is not for the purpose of IDC, the operation is performed in the active time, during which the reception of the PDCCH is possible for the corresponding time, regardless of the operation of other timers. However, in a DRX operation that is for the purpose of IDC, the operation is performed in the non-active time, during which the reception of the PDCCH is not performed, even if a scheduling request is pending.

As still another example, in changing the scheduling request operation, the operation of a scheduling request pending counter SR_COUNTER may be changed. Here, the scheduling request pending counter monitors the pending state of the scheduling request at every transmit time interval (TTI), and if the scheduling request is pending, the scheduling request pending counter increments by 1. If the count value of the scheduling request pending counter exceeds a predetermined counter upper limit value (dsr-TransMax), the random access operation starts for the purpose of the scheduling request. However, since in the DRX operation used for the purpose of IDC, the DRX active time may not start even if a scheduling request is pending, the counter increment operation in the DRX non-active time, that is, in the non-scheduled cycle, may be delayed with respect to the corresponding counter. That is, during the DRX non-active time, the counter operation is delayed even if the scheduling request is pending, and the counter may not increment at each transmit time interval. When the DRX active time is resumed, the corresponding counter increments again.

As still another example, in the scheduling request operation, the scheduling request may be permitted even in the DRX non-active time. That is, although the base station is unable to grant the terminal uplink resources with respect to the scheduling request in the corresponding non-active time, the terminal can perform the corresponding request with respect to the base station for the purpose of transferring the necessity of the uplink transmission. The base station may grant the uplink transmission resources through the next active time in response to the corresponding request, or may change the pattern of the DRX for the purpose of IDC. As an example, in order to lengthen the scheduled cycle for LTE transmission of the corresponding terminal, a longer DRX on-duration timer may be configured.

In the random access operation, in the terminal that has performed the preamble transmission, the LTE QoS and the ISM QoS are compared with each other, and the autonomous denial operation may be performed as long as the LTE QoS does not decrease too much.

As an example, if a RAR window region exists outside the on-duration timer operation region, the ISM transmission may be autonomously denied and postponed temporarily with respect to the whole of the corresponding RAR window region.

As another example, if the RAR window region exists outside the on-duration timer operation region, partial ISM transmission may be autonomously denied with respect to the RAR window region, and the partial ISM transmission may be postponed. In principle, the autonomous denial of the ISM transmission is performed with respect to PDCCH regions, and the LTE reception of the terminal is protected. Whether to deny the ISM transmission with respect to non-PDCCH regions is determined based on the PDCCH regions. If no downlink resource allocation exists in the non-PDCCH regions indicated by the PDCCHs of the subframes, it is not necessary to deny the ISM transmission, and thus the ISM transmission is permitted. If the downlink resource allocation exists in the non-PDCCH region indicated by the PDCCH of the subframes, it is not necessary to deny the ISM transmission, and thus the ISM transmission is permitted.

If the PDCCH is a PDCCH that is not scrambled by the RA-RNTI, which indicates the existence of a RAR MAC CE, it is not necessary to perform the ISM autonomous denial with respect not only to the corresponding PDCCH but also to the non-PDCCH region indicated by the PDCCH. However, with respect to the subframe region which is called by the PDCCH region, which is scrambled by the RA-RNTI, indicating the existence of the RAR MAC CE, ISM autonomous denial may be performed for the RAR reception. That is, in the RAR reception window, partial autonomous denial could be performed with respect to the ISM.

As another example, with respect to the operation for semi-persistent scheduling (SPS), ISM autonomous denial may be performed by the terminal. The LTE QoS and the ISM QoS may be compared with each other in the terminal in a manner similar to the scheduling request operation, and the autonomous denial operation may be configured to be performed as long as the LTE QoS does not decrease below a predetermined value.

Figure 24:
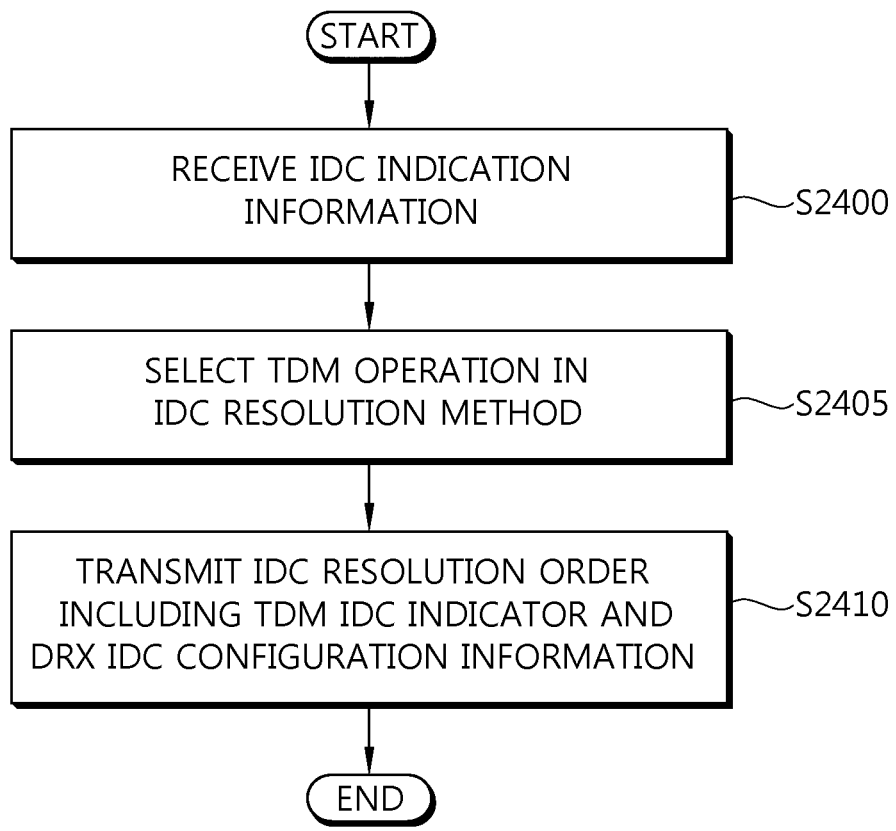
FIG. 24 is a flowchart illustrating the operation of a base station that controls in-device coexistence interference according to the present invention.

FIG. 24 is a flowchart illustrating the operation of a base station that controls in-device coexistence interference according to the present invention.

Referring to FIG. 24, the base station receives the IDC indication information from the terminal (S2400). The IDC indication information (or IDC support information) may be indication information that is discriminated with respect to the TDM operation or the FDM operation, or indication information that is integrated with the TDM operation or the FDM operation. In this case, the indication information discriminated with respect to the TDM operation or the FDM operation may have priority, such that the terminal can request the TDM operation or the FDM operation, which are IDC resolutions on the terminal side.

Further, the measurement result may be included in the IDC indication information. The measurement result may be used to determine which IDC resolution is more suitable. For example, if the target cell for the FDM operation has poor channel quality, the base station may select the TDM solution to solve the IDC problem of the serving cell.

The base station may receive the IDC indication information through an IDC indication message, a measurement report message, or a proximity indication message, which is a new message format. The IDC indication message (measurement report message or proximity indication message) may include unusable frequency band information. As an example, the IDC indication message (measurement report message or proximity indication message) may include an EARFCN value of the unusable frequency band.

On the other hand, the IDC indication message (measurement report message or proximity indication message) may include TDM pattern information. The TDM pattern may be a DRX cycle, a DRX active cycle, or a DRX subframe offset value.

Further, the IDC indication message (measurement report message or proximity indication message) may include the result of measurement considering IDC or the result of measurement excluding IDC in accordance with the rules according to which the terminal acquires the measurement samples. The measurement results included in the IDC indication message (measurement report message or proximity indication message) may include at least one of the IDC strength, the IDC activity, the measurement result considering IDC, and the measurement result excluding IDC.

To follow the step S2400, the base station selects the most suitable IDC resolution based on the IDC indication information received from the terminal (S2405). In this case, the IDC resolution may be an FDM operation or a TDM operation. The FDM operation or the TDM operation may be an operation according to FIGS. 5 to 13. As an example, if it is determined that there is no problem in the usable frequency band according to the IDC indication information through the load balance, and that handover is not greatly influenced (for example, if the RSRP or RSRQ value of the corresponding frequency band is sufficiently large) when a problem occurs in the frequency band through which the base station provides service, the FDM operation may be performed, and otherwise, the TDM operation may be performed in the serving cell. The TDM operation based on DRX in the case where the IDC resolution is the TDM operation according to the present invention will be described.

To follow the step S2405, the base station transmits the IDC resolution order on the IDC resolution method to the terminal (S2410). For example, the IDC resolution order may be transmitted through the RRC connection reconfiguration message.

As an example, if the determined IDC resolution order is the TDM operation, the base station may transmit the TDM IDC indicator indicating that the DRX pattern is caused by IDC together with a specific DRX pattern through the RRC connection reconfiguration message.

As another example, if the determined IDC resolution order is the TDM operation, the base station may transmit the DRX configuration information, such as a specific DRX pattern, through the RRC connection reconfiguration message.

As still another example, the IDC resolution order may include the operation of a prohibition timer that prohibits transmission of the IDC indication message (measurement report message or proximity indication message) for a predetermined time.

Alternatively, if the IDC resolution operation that the base station determines based on the IDC indication information is the same as the IDC resolution operation that is currently in progress, the IDC resolution order procedure may be omitted.

Alternatively, the base station may directly transmit DRX configuration information including an accurate value on the DRX pattern to the terminal. Further, the base station may transmit only the TDM IDC indicator, but may order that an autonomous DRX pattern value is to be configured, depending on the configuration in the terminal.

As an example (embodiment 5), the base station may transmit the MAC main configuration information element in which the DRX IDC configuration and the TDM IDC indicator are included. The DRX IDC configuration may include configuration information on the DRX inactivity timer, the DRX retransmission timer, and the DRX short cycle timer. As shown in Table 3 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release.

If the DRX inactivity timer is configured as psf0, the DRX inactivity timer starts through the reception of the PDCCH that indicates the new transmission and then immediately expires. Accordingly, the DRX inactivity timer does not have any influence on the active time. If the on-duration timer has expired, the active time is not maintained by the influence of the DRX inactivity timer even if a PDCCH that indicates the new transmission is received.

If the DRX retransmission timer is configured as psf0, the DRX retransmission timer does not have an influence on the active time due to the failure of data decoding in the HARQ procedure. If the on-duration timer has expired, the active time is not maintained by the value of the DRX retransmission timer even if data decoding fails in the HARQ procedure.

In this case, the values that the base station transmits through the DRX IDC configuration and the TDM IDC indicator are values for reconfiguring the existing DRX configuration values.

As another example (embodiment 6), the base station may transmit the MAC main configuration information element in which not only the existing DRX configuration but also the DRX IDC configuration and the TDM IDC indicator are included. The DRX IDC configuration information may include configuration information on the DRX inactivity timer, the DRX retransmission timer, and the DRX short cycle timer. As shown in Table 4 above, the DRX inactivity timer may be configured as psf0, the DRX retransmission timer may be configured as psf0, and the DRX short cycle timer may be configured as a value in the range of 1 to 16 or a new value that is larger. The new value may be configured as a very large value, such as 2560, or an infinite value, and thus the DRX short cycle timer may be configured to be stopped only through the RRC connection reconfiguration or release.

In this case, the terminal may reconfigure the existing DRX configuration values with respect to changed values among values that the base station transmits through the DRX configuration that is not related to IDC and values that the base station transmits through the DRX IDC configuration and the TDM IDC indicator. That is, with respect to the DRX inactivity timer, the DRX retransmission timer, and the DRX short cycle timer, a new value for IDC is signaled in addition to the existing DRX configuration value, and IDC-related values can be selected by the terminal.

As still another example (embodiment 7), the MAC main configuration information element that the base station transmits includes values related to the DRX IDC configuration (this is called new DRX configuration). That is, the new DRX configuration includes new configuration values that are different from the existing values with respect to the DRX inactivity timer, the DRX retransmission timer, and the DRX short period timer, and the MAC main configuration information element including the new DRX configuration is a new information element that is different from the existing information element according to the present invention.

According to the present invention, the base station may transmit the MAC main configuration information element in which the new DRX configuration and the TDM IDC indicator are included.

In accordance with the new DRX configuration information, the DRX inactivity timer may be configured as psf0, the DRX retransmission timer may be configured as psf0, and the DRX short cycle timer may be configured as a new value. The new value may be configured as a very large value, such as 2560, or an infinite value, and thus the DRX short cycle timer may be configured to be stopped only through the RRC connection reconfiguration or release.

In this case, the configuration values by the existing new DRX configuration are reconfigured by the values that the base station transmits through the new DRX configuration and the TDM IDC indicator.

As still another example (embodiment 8), the base station transmits only the TDM IDC indicator, but may order that the DRX is to be configured in accordance with the pre-engagement in the terminal. The TDM IDC indicator may be included in the MAC main configuration information element that the base station transmits to the terminal. In this case, if the TDM IDC indicator is received, the terminal itself may configure the DRX inactivity timer as psf0, configure the DRX retransmission timer as psf0, and configure the DRX short cycle timer as a new value. The new value may be configured as a very large value, such as 2560, or an infinite value, and thus the DRX short cycle timer may be configured to be stopped only through the RRC connection reconfiguration or release.

However, the values (psf0 and 2560) presented in the signaling technique are examples, and other values may be configured on the basis of the TDM IDC indicator. However, the base station does not transmit accurate values, but the system determines the values in advance. Accordingly, the values are already known in the terminal and the base station through separate signaling. Through the reception of the TDM IDC indicator, the known values are configured by the terminal.

In the above-described embodiment 5 to embodiment 8, the CQI masking is set up by the TDM IDC indicator, and the non-scheduled cycle (for example, the ISM transmission cycle in the TDM operation) may be protected. For example, a parameter "Cqi-Mask" of a CQI report configuration information element may be configured as "setup".

Through the above-described IDC resolution order, the terminal may perform the IDC resolution operation.

Figure 25:
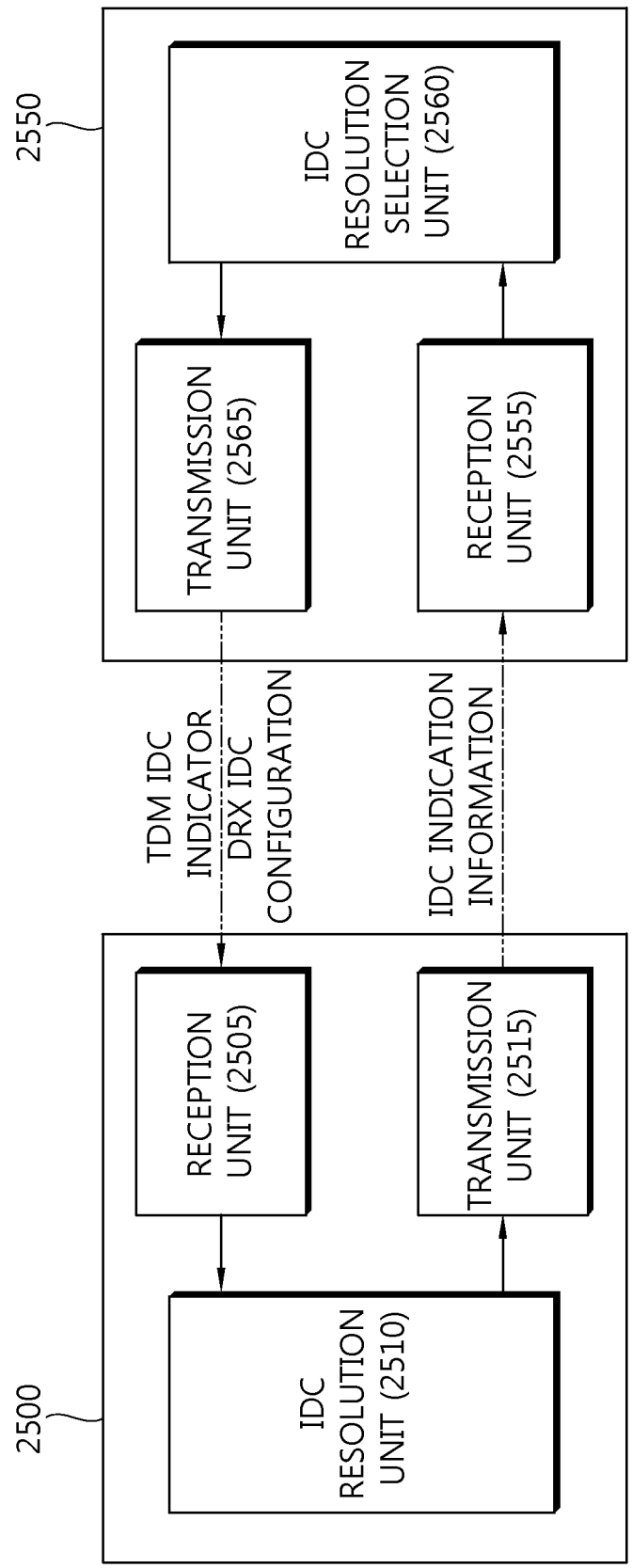
FIG. 25 is an exemplary block diagram of a terminal and a base station controlling in-device coexistence interference according to the present invention.

FIG. 25 is an exemplary block diagram of a terminal and a base station controlling in-device coexistence interference according to the present invention.

Referring to FIG. 25, a terminal 2500 includes a reception unit 2505, an IDC resolution unit 2510, and a transmission unit 2515.

Referring to FIG. 25, the transmission unit 2515 performs the IDC indication operation through transmission of the IDC indication information to the base station 2550. The IDC indication information (or IDC support information) may be indication information that is discriminated with respect to the TDM operation or the FDM operation, or indication information that is integrated with the TDM operation or the FDM operation. In this case, the indication information discriminated with respect to the TDM operation or the FDM operation may have priority such that the terminal 2500 can request the TDM operation or the FDM operation, which are IDC resolutions on the side of the terminal 2500. Further, the measurement result may be included in the IDC indication information. The measurement result may be used to determine which IDC resolution is more suitable. For example, if the target cell for the FDM operation has poor channel quality, the base station 2550 may select the TDM solution to solve the IDC problem of the serving cell.

The transmission unit 2515 may perform the IDC indication operation by transmitting an IDC indication message, a measurement report message, or a proximity indication message, which is a new message format, to the base station 2550. The IDC indication message (measurement report message or proximity indication message) may include unusable frequency band information. As an example, the IDC indication message (measurement report message or proximity indication message) may include an EARFCN value of the unusable frequency band. On the other hand, the IDC indication message (measurement report message or proximity indication message) may include TDM pattern information. The TDM pattern may be a DRX cycle, a DRX active cycle, or a DRX subframe offset value. Further, the IDC indication message (measurement report message or proximity indication message) may include the result of measurement considering IDC or the result of measurement excluding IDC in accordance with the rules according to which the terminal 2500 acquires the measurement samples. The measurement results included in the IDC indication message (measurement report message or proximity indication message) may include at least one of the IDC strength, the IDC activity, the measurement result considering IDC, and the measurement result excluding IDC.

The reception unit 2505 receives the most suitable IDC resolution order that the base station 2550 selects based on the IDC indication information from the base station 2550. For example, the IDC resolution order may be transmitted through the RRC connection reconfiguration message. As an example, if the determined IDC resolution order is the TDM operation, the reception unit 2505 may receive the TDM IDC indicator indicating that the DRX pattern is caused by IDC together with a specific DRX pattern through the RRC connection reconfiguration message. As another example, if the determined IDC resolution order is the TDM operation, the reception unit 2505 may receive the DRX configuration information, such as a specific DRX pattern, through the RRC connection reconfiguration message. As still another example, if the determined IDC resolution order is the TDM operation, the transmission unit 2515 may deny the HARQ retransmission in the LTE band for handling a beacon while the signal is transmitted in the ISM band. That is, the start of the IDC resolution order may be requested through the IDC indication message (or measurement report message or proximity indication message). As still another example, the IDC resolution order may include the operation of a prohibition timer that prohibits the transmission of the IDC indication message (measurement report message or proximity indication message) for a predetermined time.

On the other hand, if the IDC resolution operation that the base station 2550 determines based on the IDC indication information is the same as the IDC resolution operation that is currently in progress, the IDC resolution order procedure may be omitted.

The reception unit 2505 may directly receive the DRX configuration information including an accurate value on the DRX pattern from the base station 2550. Further, the reception unit 2505 receives only the IDC indicator, but an autonomous DRX pattern value may be configured depending on the configuration in the terminal 2500.

As an example, the reception unit 2505 may receive the MAC main configuration information element in which the DRX IDC configuration and the TDM IDC indicator are included. The DRX IDC configuration may include configuration information on the DRX inactivity timer, the DRX retransmission timer, and the DRX short cycle timer. As shown in Table 3 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release. If the DRX inactivity timer is configured as psf0, the DRX inactivity timer starts through the reception of the PDCCH that indicates the new transmission and then immediately expires. Accordingly, the DRX inactivity timer does not exert an influence on the active time. If the on-duration timer has expired, the active time is not maintained by the influence of the DRX inactivity timer even if the PDCCH that indicates the new transmission is received. If the DRX retransmission timer is configured as psf0, the DRX retransmission timer does not exert an influence on the active time due to the failure of data decoding in the HARQ procedure. If the on-duration timer has expired, the active time is not maintained by the value of the DRX retransmission timer even if data decoding fails in the HARQ procedure. In this case, the values that the reception unit 2505 receives through the DRX IDC configuration and the TDM IDC indicator are values for reconfiguring the existing DRX configuration values.

As another example, the reception unit 2505 may receive the MAC main configuration information element in which not only the existing DRX configuration but also the DRX IDC configuration and the TDM IDC indicator are included.

The DRX IDC configuration information may include configuration information on the DRX inactivity timer, the DRX retransmission timer, and the DRX short cycle timer. As shown in Table 4 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release. In this case, the reception unit 2505 may reconfigure the existing DRX configuration values with respect to changed values among values received through a DRX configuration that is not related to IDC and values received through the DRX IDC configuration and the TDM IDC indicator. That is, with respect to the DRX inactivity timer, the DRX retransmission timer, and the DRX short cycle timer, a new value for IDC is signaled in addition to the existing DRX configuration value, and IDC-related values can be selected by the terminal 2500.

As still another example, the MAC main configuration information element that the reception unit 2505 receives includes values related to the DRX IDC configuration (this is called new DRX configuration). That is, the new DRX configuration includes new configuration values that are different from the existing values with respect to the DRX inactivity timer, the DRX retransmission timer, and the DRX short period timer, and the MAC main configuration information element including the new DRX configuration is a new information element according to the present invention. According to the present invention, the reception unit 2505 may receive the MAC main configuration information element in which the new DRX configuration and the TDM IDC indicator are included. In accordance with the new DRX configuration information, the DRX inactivity timer may be configured as psf0, the DRX retransmission timer may be configured as psf0, and the DRX short cycle timer may be configured as a new value. The new value may be configured as a very large value, such as 2560, or an infinite value, and thus the DRX short cycle timer may be configured to be stopped only through the RRC connection reconfiguration or release. In this case, the reception unit 2505 reconfigures the configuration values that are caused by the existing new DRX configuration through the values received through the new DRX configuration and the TDM IDC indicator.

As still another example, the reception unit 2505 receives only the TDM IDC indicator, but the IDC resolution unit 2510 configures the DRX in accordance with the pre-engagement in the terminal 2500. The TDM IDC indicator may be included in the MAC main configuration information element that the reception unit 2505 receives from the base station 2550. In this case, if the reception unit 2505 receives the TDM IDC indicator, the terminal 2500 itself may configure the DRX inactivity timer as psf0, configure the DRX retransmission timer as psf0, and configure the DRX short cycle timer as a new value. The new value may be configured as a very large value, such as 2560, or an infinite value, and thus the DRX short cycle timer may be configured to be stopped only through the RRC connection reconfiguration or release. On the other hand, the values (psf0 and 2560) presented in the signaling technique are examples, and other values may be configured on the basis of the TDM IDC indicator. However, the base station 2550 does not transmit accurate values, but the system determines the values in advance. Accordingly, the values are already known in the terminal 2500 and the base station 2550 through separate signaling. Through the reception of the TDM IDC indicator, the known values are configured by the terminal 2500.

The CQI masking is set up by the TDM IDC indicator and the non-scheduled cycle (for example, the ISM transmission cycle in the TDM operation) may be protected. For example, a parameter "Cqi-Mask" of a CQI report configuration information element may be configured as "setup".

The IDC resolution unit 2510 performs the IDC resolution operation, and performs the TDM operation as the IDC resolution operation based on the IDC resolution order. As an example of the TDM operation, an operation that autonomously denies the ISM band transmission of the scheduling request operation and the random access operation may be performed. The operation of the DRX timer and CQI, PMI, PTI, or RI follow the values configured according to the MAC main configuration information elements previously received. Further, in the scheduling request operation, even if the scheduling request is pending, the non-scheduled cycle may start, the operation of the scheduling request pending counter SR_COUNTER may be changed, or the scheduling request may be permitted even in the DRX inactivity timer.

As an example, in transmitting the scheduling request in the non-scheduled cycle, an autonomous denial operation as illustrated in FIG. 12 or 13 may be performed in accordance with the determination of the terminal 2500. In the terminal 2500, LTE QoS (Quality of Service) and ISM QoS are compared with each other, and the autonomous denial operation may be configured to be performed as long as the LTE QoS does not decrease below a predetermined value.

As another example, in performing the random access operation, in the terminal 2500 that has performed the preamble transmission, the IDC resolution unit 2510 may compare the LTE QoS and the ISM QoS with each other, and perform the autonomous denial operation as long as the LTE QoS does not decrease too much.

As an example, if a RAR window region exists outside the on-duration timer operation region, the IDC resolution unit 2510 may autonomously deny and hold temporarily with respect to the whole of the corresponding RAR window region.

As another example, if the RAR window region exists outside the on-duration timer operation region, the IDC resolution unit 2510 may autonomously deny and postpone partial ISM transmission with respect to the RAR window region. In principle, the autonomous denial of the ISM transmission is performed with respect to PDCCH regions, and the LTE reception of the terminal 2500 is protected. Whether to deny the ISM transmission with respect to non-PDCCH regions is determined based on the PDCCH regions. If downlink resource allocation does not exist in the non-PDCCH regions indicated by the PDCCHs of the subframes, it is not necessary to deny the ISM transmission, and thus the ISM transmission is permitted. If downlink resource allocation exists in the non-PDCCH region indicated by the PDCCH of the subframes, it is not necessary to deny the ISM transmission, and thus the ISM transmission is permitted.

If the PDCCH is a PDCCH that is not scrambled by the RA-RNTI, which indicates the existence of a RAR MAC CE, it is not necessary to perform the ISM autonomous denial with respect not only to the corresponding PDCCH but also to the non-PDCCH region indicated by the PDCCH. However, with respect to the subframe region that is called by the PDCCH region that is scrambled by the RA-RNTI indicating the existence of the RAR MAC CE, the ISM autonomous denial may be performed for the RAR reception. That is, in the RAR reception window, partial autonomous denial could be performed with respect to the ISM. That is, if the PDCCH has been scrambled by the RA-RNTI, the ISM autonomous denial would be performed with respect to the PDCCH region of the subframe region that is called by the corresponding PDCCH.

The base station 2550 includes a reception unit 2555, an IDC resolution selection unit 2560, and a transmission unit 2565.

The reception unit 2555 receives the IDC indication information from the terminal 2500. The IDC indication information (or IDC support information) may be indication information that is discriminated with respect to the TDM operation or the FDM operation, or indication information that is integrated with the TDM operation or the FDM operation. In this case, the indication information discriminated with respect to the TDM operation or the FDM operation may request priority of the TDM operation or the FDM operation, which are IDC resolution methods on the side of the terminal 2500.

Further, the measurement result may be included in the IDC indication information. The measurement result may be used to determine which IDC resolution is more suitable. For example, if the target cell for the FDM operation has poor channel quality, the IDC resolution selection unit 2560 may select the TDM solution to solve the IDC problem of the serving cell.

The reception unit 2555 may receive the IDC indication information through an IDC indication message, a measurement report message, or a proximity indication message, which is a new message format. The IDC indication message (measurement report message or proximity indication message) may include unusable frequency band information. As an example, the IDC indication message (measurement report message or proximity indication message) may include an EARFCN value of the unusable frequency band. On the other hand, the IDC indication message (measurement report message or proximity indication message) may include TDM pattern information. The TDM pattern may be a DRX cycle, a DRX active cycle, or a DRX subframe offset value. Further, the IDC indication message (measurement report message or proximity indication message) may include the result of measurement considering IDC or the result of measurement excluding IDC in accordance with the rules according to which the terminal 2500 acquires the measurement samples. The measurement results included in the IDC indication message (measurement report message or proximity indication message) may include at least one of the IDC strength, the IDC activity, the measurement result considering IDC, and the measurement result excluding IDC.

The IDC resolution selection unit 2560 selects the most suitable IDC resolution based on the IDC indication information received from the terminal (S2405). In this case, the IDC resolution may be an FDM operation or a TDM operation. The FDM operation or the TDM operation may be an operation according to FIGS. 5 to 13. As an example, if it is determined that there is no problem in the usable frequency band according to the IDC indication information through the load balance and handover is not greatly influenced (for example, if the RSRP or RSRQ value of the corresponding frequency band is sufficiently large) when a problem occurs in the frequency band through which the base station 2550 provides service, the FDM operation may be performed, and otherwise, the TDM operation may be performed in the serving cell. The TDM operation based on the DRX in the case where the IDC resolution is the TDM operation according to the present invention will be described.

The transmission unit 2565 transmits the IDC resolution order on the IDC resolution method to the terminal 2500. For example, the IDC resolution order may be transmitted through the RRC connection reconfiguration message.

As an example, if the determined IDC resolution order is the TDM operation, the transmission unit 2565 may transmit the TDM IDC indicator indicating that the DRX pattern is caused by IDC together with a specific DRX pattern through the RRC connection reconfiguration message.

As another example, if the determined IDC resolution order is the TDM operation, the transmission unit 2565 may transmit the DRX configuration information, such as a specific DRX pattern, through the RRC connection reconfiguration message.

As still another example, the IDC resolution order may include the operation of a prohibition timer that prohibits transmission of the IDC indication message (measurement report message or proximity indication message) for a predetermined time.

On the other hand, if the IDC resolution operation that the IDC resolution selection unit 2560 determines based on the IDC indication information is the same as the IDC resolution operation that is currently in progress, the IDC resolution order procedure may be omitted.

On the other hand, the transmission unit 2565 may directly transmit the DRX configuration information including an accurate value on the DRX pattern to the terminal 2500. Further, the transmission unit 2565 may transmit only the TDM IDC indicator, but may order that an autonomous DRX pattern value is to be configured depending on the configuration in the terminal 2500.

As an example, the transmission unit 2565 may transmit the MAC main configuration information element in which the DRX IDC configuration and the TDM IDC indicator are included. The DRX IDC configuration may include configuration information on the DRX inactivity timer, the DRX retransmission timer, and the DRX short cycle timer. As shown in Table 3 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release. If the DRX inactivity timer is configured as psf0, the DRX inactivity timer starts through the reception of the PDCCH that indicates the new transmission and then immediately expires. Accordingly, the DRX inactivity timer does not exert an influence on the active time. If the on-duration timer has expired, the active time is not maintained by the influence of the DRX inactivity timer even if the PDCCH that indicates the new transmission is received.

If the DRX retransmission timer is configured as psf0, the DRX retransmission timer does not exert an influence on the active time due to failure of data decoding in the HARQ procedure. If the on-duration timer has expired, the active time is not maintained by the value of the DRX retransmission timer even if data decoding fails in the HARQ procedure. In this case, the values that the transmission unit 2565 transmits through the DRX IDC configuration and the TDM IDC indicator are values for reconfiguring the existing DRX configuration values.

As another example, the transmission unit 2565 may transmit the MAC main configuration information element in which not only the existing DRX configuration but also the DRX IDC configuration and the TDM IDC indicator are included. The DRX IDC configuration information may include configuration information on the DRX inactivity timer, the DRX retransmission timer, and the DRX short cycle timer. As shown in Table 4 above, the DRX inactivity timer may be configured as psf0, the DRX retransmission timer may be configured as psf0, and the DRX short cycle timer may be configured as a value in the range of 1 to 16, or a new value that is larger. The new value may be configured as a very large value, such as 2560, or an infinite value, and thus the DRX short cycle timer may be configured to be stopped only through the RRC connection reconfiguration or release. In this case, the terminal 2500 may reconfigure the existing DRX configuration values with respect to changed values among values that the transmission unit 2565 transmits through RX configuration that is not related to IDC and values that the base station transmits through the DRX IDC configuration and the TDM IDC indicator. That is, with respect to the DRX inactivity timer, the DRX retransmission timer, and the DRX short cycle timer, a new value for IDC is indicated in addition to the existing DRX configuration value, and IDC-related values can be selected by the terminal 2500.

As still another example, the MAC main configuration information element that the transmission unit 2565 transmits includes values related to the DRX IDC configuration (this is called new DRX configuration). That is, the new DRX configuration includes new configuration values that are different from the existing values with respect to the DRX inactivity timer, the DRX retransmission timer, and the DRX short period timer, and the MAC main configuration information element including the new DRX configuration is a new information element that is different from the existing information element according to the present invention.

According to the present invention, the transmission unit 2565 may transmit the MAC main configuration information element in which the new DRX configuration and the TDM IDC indicator are included.

In accordance with the new DRX configuration information, the DRX inactivity timer may be configured as psf0, the DRX retransmission timer may be configured as psf0, and the DRX short cycle timer may be configured as a new value. The new value may be configured as a very large value, such as 2560, or an infinite value, and thus the DRX short cycle timer may be configured to be stopped only through the RRC connection reconfiguration or release.

In this case, the configuration values from the existing new DRX configuration are reconfigured according to the values that the transmission unit 2565 transmits through the new DRX configuration and the TDM IDC indicator.

As still another example, the transmission unit 2565 transmits only the TDM IDC indicator, but may order that the DRX be configured in accordance with the pre-engagement in the terminal 2500. The TDM IDC indicator may be included in the MAC main configuration information element that the transmission unit 2565 transmits to the terminal 2500. In this case, if the TDM IDC indicator is received, the terminal 2500 itself may configure the DRX inactivity timer as psf0, configure the DRX retransmission timer as psf0, and configure the DRX short cycle timer as a new value. The new value may be configured as a very large value, such as 2560, or an infinite value, and thus the DRX short cycle timer may be configured to be stopped only through the RRC connection reconfiguration or release. However, the values (psf0 and 2560) presented in the signaling technique are examples, and other values may be configured on the basis of the TDM IDC indicator. However, the transmission unit 2565 does not transmit accurate values, but the system determines the values in advance. Accordingly, the values are already known in the terminal 2500 and the base station 2550 through separate signaling. Through the reception of the TDM IDC indicator, the known values are configured by the terminal 2500.

The CQI masking is set up by the TDM IDC indicator, and the non-scheduled cycle (for example, the ISM transmission cycle in the TDM operation) may be protected. For example, a parameter "Cqi-Mask" of a CQI report configuration information element may be configured as "setup".

According to the present invention, it is possible to cause TDM operation related to in-device coexistence interference to be performed, and to transmit DRX configuration information related to the TDM operation.

According to the present invention, the terminal can perform autonomous denial, either entirely or partially, with respect to an ISM band in order to control in-device coexistence interference, and can perform autonomous denial selectively with respect to a region indicated by a PDCCH.

The above-described embodiments of the present invention are merely exemplary, and it will be understood by those of ordinary skill in the art that various changes and modifications are possible without departing from the scope of the present invention. Accordingly, the above-described embodiments are not to limit the technical concept of the present invention, but to explain the same, and the scope of the present invention is defined by the appended claims rather than the detailed description as described above. It is to be understood that all corrections and modifications derived from the meanings and scope of the following claims and the equivalent concept fall within the scope of the present invention.

What is claimed is:

1. A method for controlling in-device coexistence interference (IDC) through a User Equipment (UE) in a wireless communication system, comprising:
    transmitting IDC indication information including an unusable frequency band that is a frequency band in which performing communication is interfered by IDC interference to an evolved NodeB (eNB);
    receiving, from the eNB, Radio Resource Control (RRC) connection reconfiguration including IDC Discontinuous Reception (DRX) configuration reconfiguring DRX relating to the unusable frequency band based on the IDC indication information; and
    performing autonomous denial of Industrial Scientific Medical (ISM) transmission in the unusable frequency band by reconfiguring DRX based on the IDC DRX configuration,
    wherein the IDC DRX configuration includes information configuring a DRX retransmission timer and information configuring a DRX short cycle to a predetermined cycle for avoiding the IDC interference.

2. The method of claim 1, wherein the RRC connection reconfiguration further includes information for configuring a time-division multiplexing (TDM) pattern which is not related to IDC interference.

3. The method of claim 1, wherein the autonomous denial of ISM transmission in the unusable frequency band autonomously denies a transmission of a scheduling request.

4. The method of claim 1, wherein the autonomous denial of ISM transmission in the unusable frequency band autonomously denies the ISM transmission with respect to a physical downlink control channel (PDCCH) region in a random access operation and autonomously denies the ISM transmission with respect to a non-PDCCH region in a case where downlink resource allocation exists in the non-PDCCH region that is indicated by the PDCCH region.

5. A User Equipment (UE) for controlling in-device coexistence interference (IDC) in a wireless communication system, comprising:
- a transmitter to transmit IDC indication information including an unusable frequency band that is a frequency band in which performing communication is interfered by IDC interference to an evolved NodeB (eNB);
- a receiver to receive, from the eNB, Radio Resource Control (RRC) connection reconfiguration including IDC Discontinuous Reception (DRX) configuration reconfiguring DRX relating to the unusable frequency band based on the IDC indication information; and
- an IDC resolution unit to autonomously deny Industrial Scientific Medical (ISM) transmission in the unusable frequency band by reconfiguring DRX based on the IDC DRX configuration,
- wherein the IDC DRX configuration includes information confiquring a DRX retransmission timer and information confiquring a DRX short cycle to a predetermined cycle for avoiding the IDC interference.

6. The UE of claim 5, wherein the RRC connection reconfiguration further includes information for configuring a time-division multiplexing (TDM) pattern which is not related to IDC interference.

7. The UE of claim 5, wherein the IDC resolution unit autonomously denies a transmission of a scheduling request.

8. The UE of claim 5, wherein the IDC resolution unit autonomously denies the ISM transmission with respect to a physical downlink control channel (PDCCH) region in a random access operation and autonomously denies the ISM transmission with respect to a non-PDCCH region in a case where downlink resource allocation exists in the non-PDCCH region that is indicated by the PDCCH region.

9. A method for controlling in-device coexistence interference (IDC) through an evolved-NodeB (eNB) in a wireless communication system, comprising:
- receiving, from a User Equipment (UE), IDC indication information including an unusable frequency band that is a frequency band in which performing communication is interfered by IDC interference;
- determining IDC Discontinuous Reception (DRX) configuration reconfiguring DRX relating to the unusable frequency band based on the IDC indication information, and selecting IDC resolution operation autonomously denying Industrial Scientific Medical (ISM) transmission in the unusable frequency band; and
- transmitting, to the UE, Radio Resource Control (RRC) connection reconfiguration including the IDC DRX configuration and the IDC resolution operation;
- wherein the IDC DRX configuration includes information confiquring a DRX retransmission timer and information confiquring a DRX short cycle to a predetermined cycle for avoiding the IDC interference.

10. The method of claim 9, wherein the RRC connection reconfiguration further includes information for configuring a time-division multiplexing (TDM) pattern which is not related to IDC interference; and
- the DRX pattern based on the IDC DRX configuration is information reconfiguring the TDM pattern which is not related to IDC interference.

11. The method of claim 9, wherein the IDC resolution operation comprises autonomously denying a transmission of a scheduling request.

12. The method of claim 9, wherein the IDC resolution operation comprises autonomously denying the ISM transmission with respect to a physical downlink control channel (PDCCH) region in a random access operation and autonomously denying the ISM transmission with respect to a non-PDCCH region in a case where downlink resource allocation exists in the non-PDCCH region that is indicated by the PDCCH region.

13. An evolved-NodeB (eNB) for controlling in-device coexistence interference (IDC) in a wireless communication system, comprising:
- a receiver to receive, from a User Equipment (UE), IDC indication information including an unusable frequency band that is a frequency band in which performing communication is interfered by IDC interference;
- an IDC resolution selection unit to determine IDC Discontinuous Reception (DRX) configuration reconfiguring DRX relating to the unusable frequency band based on the IDC indication information, and selecting IDC resolution operation autonomously denying Industrial Scientific Medical (ISM) transmission in the unusable frequency band; and
- a transmitter to transmit, to the UE, Radio Resource Control (RRC) connection reconfiguration including the IDC DRX configuration and the IDC resolution operation;
- wherein the IDC DRX configuration includes information configuring a DRX retransmission timer and information configuring a DRX short cycle to a predetermined cycle for avoiding the IDC interference.

14. The eNB of claim 13, wherein the RRC connection reconfiguration further includes information for configuring a time-division multiplexing (TDM) pattern which is not related to IDC interference; and
- the DRX pattern based on the IDC DRX configuration is information reconfiguring the TDM pattern which is not related to IDC interference.

15. The eNB of claim 13, wherein the IDC resolution operation comprises autonomously denying a transmission of a scheduling request.

16. The eNB of claim 13, wherein the IDC resolution operation comprises autonomously denying the ISM transmission with respect to a physical downlink control channel (PDCCH) region in a random access operation and autonomously denying the ISM transmission with respect to a non-PDCCH region in the case where downlink resource allocation exists in the non-PDCCH region that is indicated by the PDCCH region.

* * * * *